US012798078B2

(12) United States Patent
Feliciano et al.

(10) Patent No.: US 12,798,078 B2
(45) Date of Patent: Nov. 17, 2026

(54) MICRO-ROBOT SEPARATOR DESIGN FOR LASHES

(71) Applicant: L'Oreal, Paris (FR)

(72) Inventors: Rafael Feliciano, New Providence, NJ (US); Gregoire Charraud, Jersey City, NJ (US)

(73) Assignee: L'Oréal, Paris (FR)

( * ) Notice: Subject to any disclaimer, the term of this patent is extended or adjusted under 35 U.S.C. 154(b) by 260 days.

(21) Appl. No.: 18/649,100

(22) Filed: Apr. 29, 2024

(65) Prior Publication Data

US 2025/0332710 A1 Oct. 30, 2025

(51) Int. Cl.

| | |
|---|---|
| ***B25J 7/00*** | (2006.01) |
| ***A41G 5/02*** | (2006.01) |
| ***B25J 11/00*** | (2006.01) |

(52) U.S. Cl.

CPC .................................... *B25J 7/00* (2013.01); *A41G 5/02* (2013.01); *B25J 11/008* (2013.01)

(58) Field of Classification Search

CPC .............. B25J 7/00; B25J 11/008; A41G 5/02

See application file for complete search history.

(56) References Cited

U.S. PATENT DOCUMENTS

| | | | | |
|---|---|---|---|---|
| 8,593,016 | B2 * | 11/2013 | Pelrine | H02K 41/03 310/12.05 |
| 8,686,602 | B2 | 4/2014 | Pelrine et al. | |
| 8,941,270 | B2 | 1/2015 | Pelrine et al. | |
| 9,607,347 | B1 * | 3/2017 | Li | G06T 1/0014 |
| 9,647,523 | B2 * | 5/2017 | Pelrine | H02K 41/03 |
| 10,044,253 | B2 | 8/2018 | Pelrine et al. | |
| 10,861,627 | B2 | 12/2020 | Pelrine et al. | |
| 11,565,402 | B2 * | 1/2023 | Berger | B25J 9/104 |

(Continued)

FOREIGN PATENT DOCUMENTS

| | | |
|---|---|---|
| CN | 1843284 A | 10/2006 |
| EP | 3870412 B1 | 12/2023 |

OTHER PUBLICATIONS

Search Report and Written Opinion mailed Jan. 29, 2025; issued in corresponding French Application No. 2406600; filed Jun. 20, 2024; 8 pages.

(Continued)

*Primary Examiner* — Thai T Dinh

(74) *Attorney, Agent, or Firm* — CHRISTENSEN O'CONNOR JOHNSON KINDNESS PLLC

(57) ABSTRACT

A micro-robot crane system including a microrobot crane having a back micro-robot, including a first plurality of magnets, a rotary bearing, and a separation arm, where the separation arm includes a separating tip, and a front micro-robot, including a second plurality of magnets, a mount configured to slide along the separation arm, and a mechanical stop, configured to prevent the separation arm from disengaging from the mount, and where the front micro-robot is configured to raise and lower the separation arm. Further, a method of separating an eyelash, the method including moving a first micro-robot crane to a first side of an eye, positioning a separator tip of a separator arm into a lash line of the eye by moving a front micro-robot of the first micro-robot crane, and moving the first micro-robot crane in a first direction to separate a first side of the eyelashes.

16 Claims, 34 Drawing Sheets

(56) References Cited

U.S. PATENT DOCUMENTS

| | | | | |
|---|---|---|---|---|
| 11,701,786 | B2 * | 7/2023 | Lu | B25J 15/0246 318/560 |
| 12,033,878 | B2 * | 7/2024 | Hatano | B25J 11/0095 |
| 2009/0066100 | A1 | 3/2009 | Bosscher et al. | |
| 2014/0225694 | A1 | 8/2014 | Sitti et al. | |
| 2021/0353010 | A1 | 11/2021 | Harnett et al. | |
| 2021/0387364 | A1 | 12/2021 | Amundson et al. | |
| 2022/0415688 | A1 * | 12/2022 | Hatano | B25J 11/0095 |
| 2025/0331589 | A1 * | 10/2025 | Feliciano | A41G 5/02 |

OTHER PUBLICATIONS

Search Report and Written Opinion mailed Jan. 23, 2025; issued in corresponding French Application No. 2406594; filed Jun. 20, 2024; 6 pages.

Search Report and Written Opinion mailed Jan. 22, 2025; issued in corresponding French Application No. 2406605; filed Jun. 20, 2024; 6 pages.

Kim, Sukjun et al.; "PCB-BOT: The First Steps of a 4 MG Legged Micro Robot"; Solid-State, Actuators and Microsystems Workshop Technical Digest; Jun. 5, 2022; pp. 110-111.

Office Action issued Nov. 28, 2025 for corresponding U.S. Appl. No. 18/649,034, filed Apr. 29, 2024, 20 pages.

* cited by examiner

MICRO-ROBOT SEPARATOR DESIGN FOR LASHES

SUMMARY

Disclosed herein is a micro-robot crane system including a microrobot crane, including a back micro-robot, having a first plurality of magnets, a rotary bearing, and a separation arm, where the separation arm includes a separating tip, and a front micro-robot, having a second plurality of magnets, a mount configured to slide along the separation arm, and a mechanical stop, configured to prevent the separation arm from disengaging from the mount, and where the front micro-robot is configured to raise and lower the separation arm.

In some embodiments, the back micro-robot is configured to remain stationary, while the front micro-robot moves the separating arm up or down. In some embodiments, front micro-robot and the back micro-robot are configured to move in a same direction together to separate an adjacent lash.

In some embodiments, the separating tip is configured to separate adjacent eyelashes.

In some embodiments, the micro-robot crane is a first micro-robot crane and the system further comprises a second micro-robot crane. In some embodiments, the second micro-robot crane comprises a second separation arm. In some embodiments, the second microrobot crane comprises a second back micro-robot, and a second front micro-robot. In some embodiments, first front micro-robot and the first back micro-robot are configured to separate a first adjacent lash on a first side, and where the second front micro-robot and the second back micro-robot are configured to separate a second adjacent lash on a second side, opposite the first side.

In some embodiments, the system further includes a flexible printed circuit board (PCB) substrate, a motor base located under the flexible PCB substrate; and one or more linear actuators coupled to the motor base, wherein the one or more linear actuators are configured to adjust the flexible PCB substrate. In some embodiments, the flexible PCB substrate is configured to adjust a pitch, a yaw, a roll, or a combination thereof of the front micro-robot, the back micro-robot, or both. In some embodiments, the system further comprises one or more cameras configured to analyze a user, the micro-robot crane, the flexible PCB substrate, or a combination thereof. In some embodiments, the one or more cameras is communicatively coupled with a processor, where the processor is configured to determine a desired height of the one or more linear actuators, a repositioning of the micro-robot crane, or both.

In another aspect, disclosed herein is a method of separating an eyelash, the method including moving a first micro-robot crane to a first side of an eye, positioning a separator tip of a separator arm into a lash line of the eye by moving a front micro-robot of the first micro-robot crane, and moving the first micro-robot crane in a first direction to separate a first side of the eyelashes.

In some embodiments, the method further includes moving a second micro-robot crane to a second side of an eye, positioning a second separator tip of a second separator arm into the lash line of the eye by moving a front micro-robot of the second micro-robot crane, and moving the first micro-robot crane in a second direction to separate a second side of the eyelashes, so that a gap is formed between the first side of the eyelashes and the second side of the eyelashes. In some embodiments, the method further includes applying a single eyelash into the gap between the first side of the eyelashes and the second side of the eyelashes. In some embodiments, applying the single eyelash includes securing a first micro-robot having a wire comb to a first location, positioning a second micro-robot along the wire comb with a tube so that a gripper of the second micro-robot contacts an attachment end of the wire comb, gripping an eyelash between the gripper and the attachment end, positioning the second micro-robot to apply the eyelash, retracting the gripper from the attachment end, and applying the eyelash. In some embodiments, the second micro-robot further includes a first gripper and a second gripper, and where the method further includes gripping an eyelash between the attachment end and an offset distance between the first gripper and the second gripper.

In some embodiments, the method further includes monitoring the first micro-robot crane, the second micro-robot crane, or both, transmitting image data to the processor, and adjusting a position of the first micro-robot crane, the second micro-robot crane, or both based on the image data.

In some embodiments, positioning the first micro-robot crane, the second micro-robot crane, or both includes sliding the one or more micro-robots over a flexible printed circuit board (PCB) substrate. In some embodiments, positioning the first micro-robot crane, the second micro-robot crane, or both includes levitating the one or more micro-robots over a PCB substrate.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Disclosed herein is a micro-robot crane system configured to apply eyelash implants, false eyelashes, and the like. In some embodiments, the micro-robot crane system includes one or more micro-robot cranes. Each micro-robot crane may include a back micro-robot having a first plurality of magnets of alternating magnetic fields arranged in an array, a rotary bearing, and a separation arm including a separation tip. Each micro-robot crane may further include a front micro-robot having a second plurality of magnets of alternating magnetic fields arranged in an array, a mount configured to slide along the separation arm, and a mechanical stop configured to prevent the separation arm from disengaging with the mount. In tandem, the front micro-robot and the back micro-robot can raise and lower the separation arm so that the separating tip contacts the lash line. Then the front micro-robot and the back micro-robot can move in a direction together at a same speed and maintaining a same distance between then to separate individual eyelashes of a user. In some embodiments, the micro-robot crane system may slide or levitate over a flexible printed circuit board (PCB) substrate configured to adjust in response to a plurality of linear actuators to efficiently and accurately adjust the micro-robot crane system.

FIGS. 1A-1F are example micro-robots, in accordance with the present technology. In some embodiments, disclosed herein are systems for applying eyelashes, using one or more micro-robots based on printed circuit board (PCB) drivers.

Figure 1B:
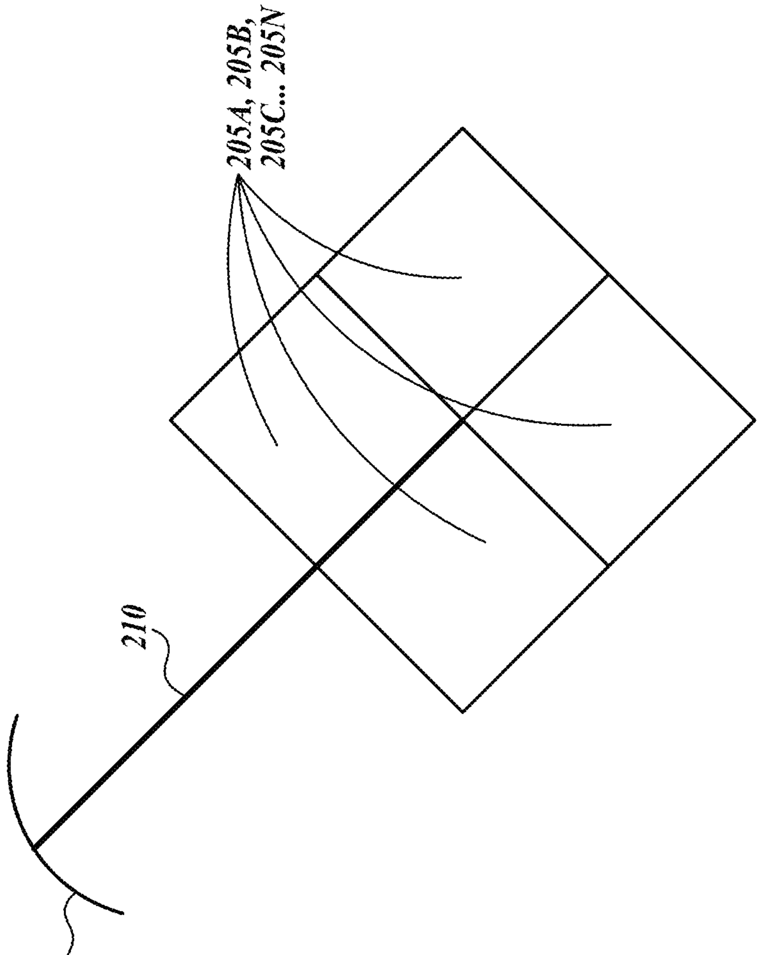
FIGS. 1A-1F are example micro-robots, in accordance with the present technology.
Figure 1A:
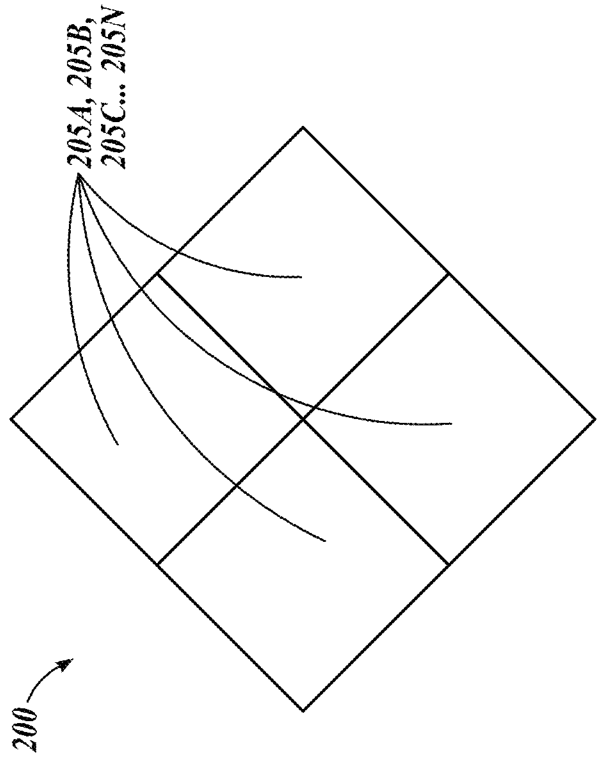

FIG. 1A is an example micro-robot 200 including four magnets 205A, 205B, 205C . . . 205N. In some embodiments, the four magnets (also referred to herein as a plurality of magnets) 205A, 205B, 205C . . . 205N are disposed in an array with an alternating magnetization. For example, in FIG. 1A, magnets 205A (top) and 205C (bottom) may have a first magnetization and magnets 205B (left) and 205N (right) may have a second magnetization, opposite the first magnetization. In some embodiments, the plurality of magnets 205A, 205B, 205C . . . 205N are arranged like a checkerboard. In some embodiments, the plurality of magnets 205A, 205B, 205C . . . 205N may be comprised of any material, such as nickel, iron, samarium, or the like. In some embodiments, the plurality of magnets 205A, 205B, 205C . . . 205N are comprised of neodymium (NdFeB). In an embodiment, the plurality of magnets comprises one or more magnetic materials. Non-limiting examples of magnetic materials include ferromagnetic elements (e.g., cobalt, gadolinium, iron, or the like), rare earth elements, ferromagnetic metals, ferromagnetic transition metals, materials that exhibit magnetic hysteresis, or the like or combinations thereof. Further non-limiting examples of magnet materials include nickel, iron, samarium, or the like or combinations thereof.

FIG. 1B shows an example micro-robot 200 having a plurality of magnets 205A, 205B, 205C . . . 205N, an applicator 210, and an eyelash (or cluster of eyelashes) L. In some embodiments, the applicator 210 is configured to hold an eyelash or eyelash cluster, for eventual application to an eyelid. As used herein, the term "eyelash cluster" means two or more eyelashes that have been grouped together, either by being manufactured together or attached together, such as with adhesive. Individual eyelashes within an eyelash cluster may have a same length, thickness, color, finish, or the like, or may have different lengths, thicknesses, colors, finishes, etc.

Figure 1D:
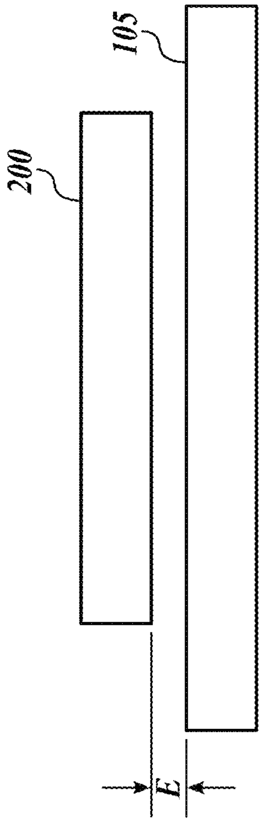
Figure 1C:
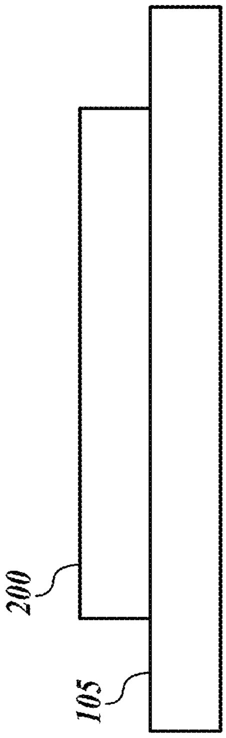

FIGS. 1C-1D show example micro-robots 200 positioned on a printed circuit board (PCB) substrate 105. In some embodiments, the checkerboard configuration of a plurality of magnets (such as plurality of magnets 205A, 205B, 205C . . . 205N) in conjunction with a graphite layer of the substrate 105 confines the micro-robot 200 to a specific location in (x, y, z). A magnetic potential well may be generated to localize the micro-robot 200. In some embodiments, a magnetic force is generated by four PCB current traces located inside the substrate 105. Pairs of these four traces are typically driven in quadrature, behaving very similarly to a linear stepper motor. While driving the currents in quadrature controls the relative phase between the pairs of currents and therefore the micro-robot 200 in-plane position, modulating the absolute magnitude of the traces increases or decreases the out-of-plane force between the board and the robot providing about 40 to 70 μm of Z motion.

FIG. 1C shows a sliding substrate system. In such embodiments, the graphite layer of the substrate 105 may be thin, such as 25 to 100 μm thick. In such systems, the micro-robot(s) 200 are configured to slide across the substrate.

FIG. 1D shows a levitating substrate system. In such embodiments, the graphite layer of the substrate 105 may be thick, such as 0.5 mm thick. In such embodiments, the micro-robot 200 may levitate off of the substrate 105 by an elevation E.

Figure 1F:
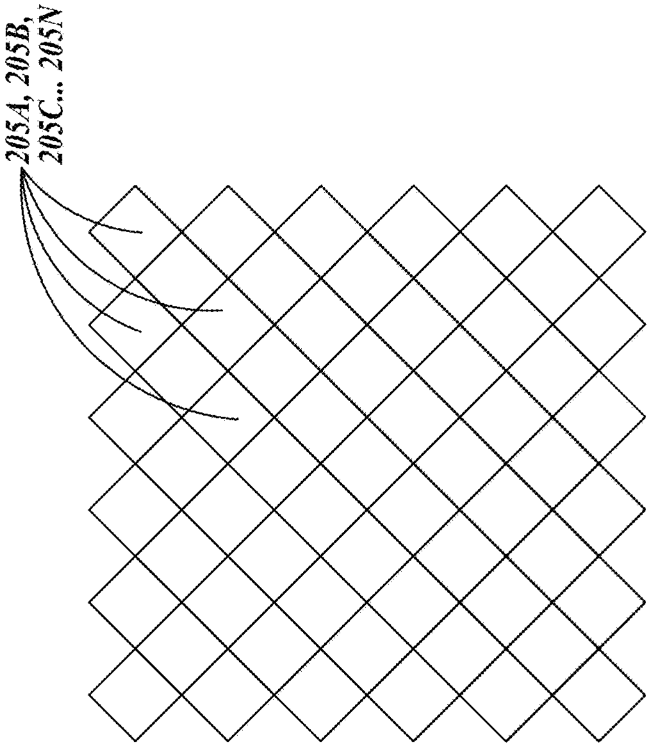
Figure 1E:
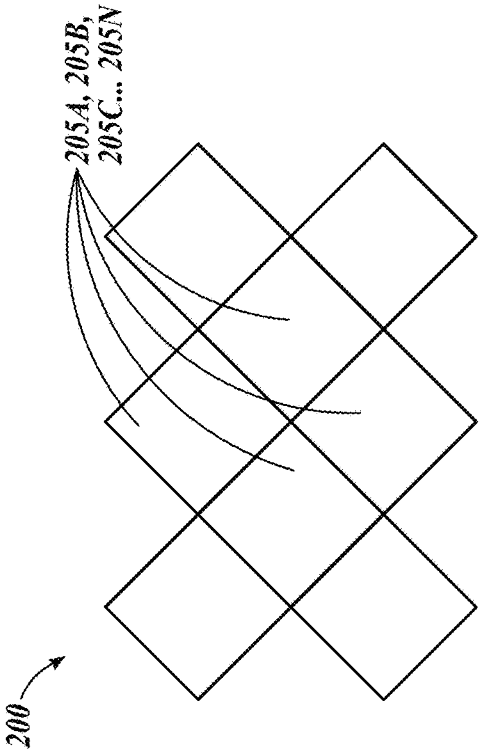

FIGS. 1E-1F show various layouts for micro-robots 200. It should be understood that any number of magnets may be included in the plurality of magnets 205A, 205B, 205C . . . 205N. In some embodiments, the plurality of magnets 205A, 205B, 205C . . . 205N are disposed in an alternating orientation, where the magnetization is alternated between adjacent magnets.

In some embodiments, the micro-robot(s) 200 are controlled by the local trace pattern and currents. That is, the micro-robot's control is area- or zone-based rather than one that moves with the micro-robot (as would be the case for conventional motorized robots). Zone control has both advantages and disadvantages for multi-agent control. The disadvantage of zone control is that two micro-robots in close proximity may not be independently controlled unless they are in different independent zones. The advantage of zone control is that large numbers of micro-robots may be controlled to execute the same motion in parallel using only a few control channels. The control zone approach generally reduces the numbers of control channels needed since the micro-robots do not need to carry extra control channels in areas which need, for example, only one degree-of-freedom for transport.

In some embodiments, the substrate or other lithographically patterned micro-circuits, enable large and complex drive systems to be made relatively easily using conventional batch fabrication. In some embodiments, the systems disclosed herein could be as large as 30 cm×30 cm, or even larger. In some embodiments, the micro-robot(s) may transition between separate substrates 105 if they are in proximity of one another.

In some embodiments, as described herein, micro-robots may be configured to "cooperate" with one another by doing different steps in the process of applying eyelashes to a single eye or a single user having two eyes. For example, one or more micro-robots 200 may be configured to separate out eyelashes, another micro-robot may be configured to apply the lash, and yet another micro-robot may be configured to apply an eyelash glue or adhesive. In some embodiments, multiple micro-robots may work together more directly, as explained herein.

Figure 2A:
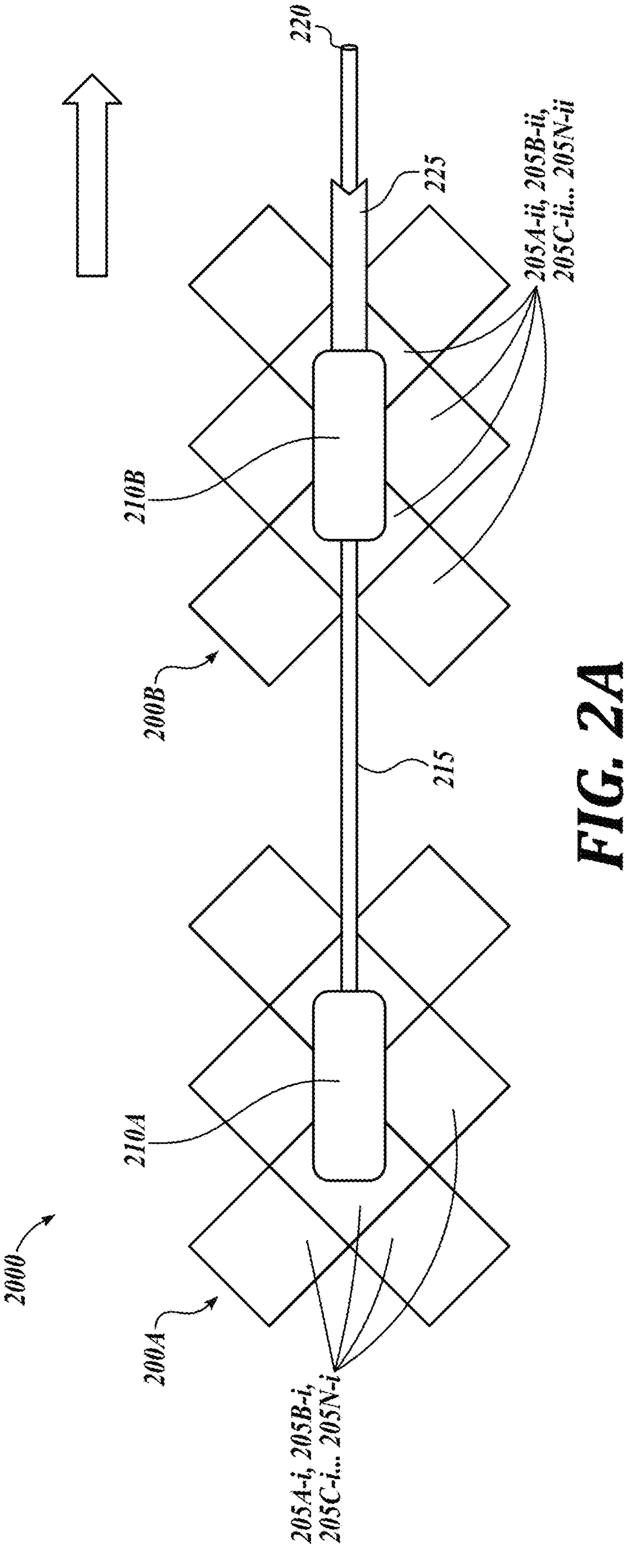
FIGS. 2A-2B is an example system of applying eyelashes, in accordance with the present technology.
Figure 2B:
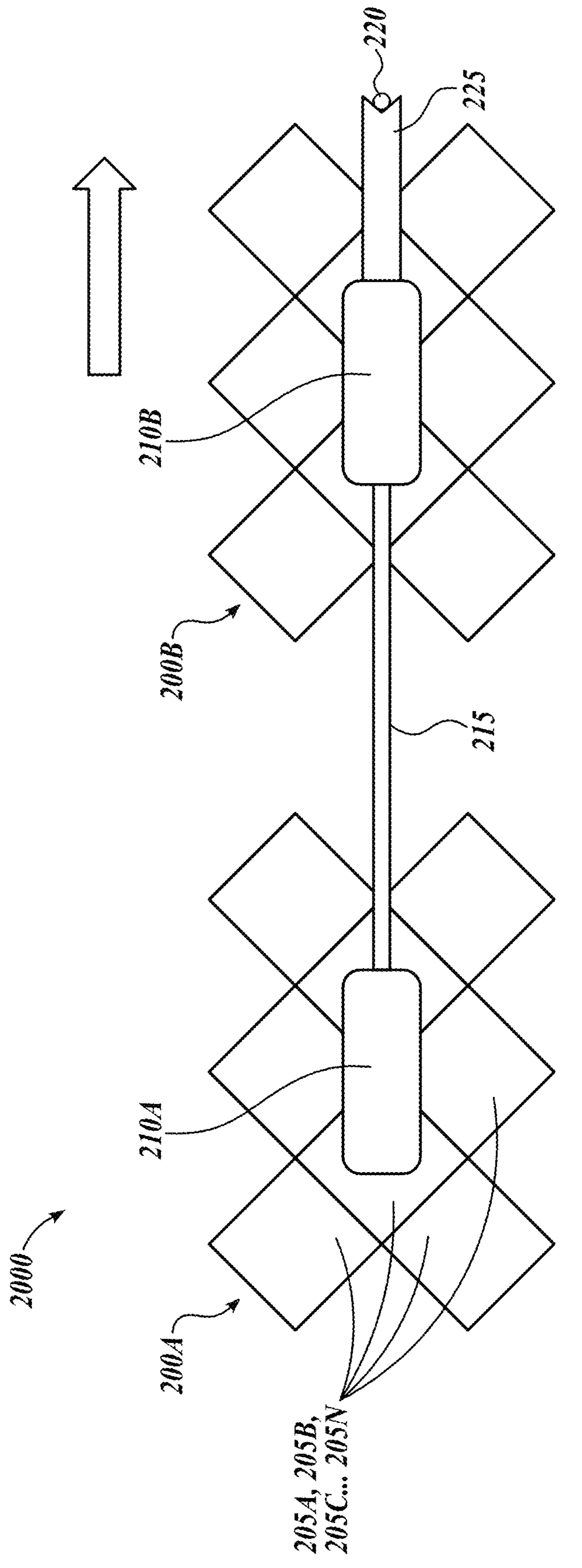

FIGS. 2A-2B is an example system of applying eyelashes 2000, in accordance with the present technology. In some embodiments, system 2000 (also referred to herein as "applicator system 2000") includes a first micro-robot 200A having a first plurality of magnets 205A-i, 205B-i, 205C-i . . . 205N-i and a wire comb 215, and a second micro-robot 200B having a second plurality of magnets 205A-ii, 205B-ii, 205C-ii . . . 205N-ii, a tube 210B, and a gripper 225.

In some embodiments, the first micro-robot 200A includes a first plurality of magnets 205A-i, 205B-i, 205C-i . . . 205N-i. In some embodiments, the first plurality of magnets 205A-i, 205B-i, 205C-i . . . 205N-i is arranged in an array of alternating magnetization, as explained herein. In some embodiments, the first plurality of magnets 205A-i, 205B-i, 205C-i . . . 205N-i is a plurality of NdFeB magnets.

In some embodiments, the first micro-robot 200A also includes a holder 210A configured to retain the wire comb 215. In some embodiments, the wire comb 215 is configured to slide into the holder 210A. In some embodiments, the wire comb 215 is integrated into the holder 210A.

The wire comb 215 may be made of metal, ceramic, carbon, plastic, or a combination thereof. In some embodiments, the wire comb 215 includes an attachment end 220. As shown in FIGS. 3A-3D, the attachment end 220 may be disposed at substantially a 45-degree angle from the wire comb 215 to form a "hook" shape.

In some embodiments, the second micro-robot 200B includes a second plurality of magnets 205A-ii, 205B-ii, 205C-ii . . . 205N-ii. In some embodiments, the second plurality of magnets 205A-ii, 205B-ii, 205C-ii . . . 205N-ii is arranged in an array of alternating magnetization, as explained herein. In some embodiments, the second plurality of magnets 205A-ii, 205B-ii, 205C-ii . . . 205N-ii is a plurality of NdFeB magnets.

In some embodiments, the second micro-robot 200B further includes a tube 210B. The tube 210B is configured to slide alone the wire comb 215 of the first micro-robot 200A. In this manner, the second micro-robot 200B may move back and forth (such as in the direction of the arrow in FIG. 2A) along the wire comb 215.

In some embodiments, the second micro-robot further comprises a gripper 225. In some embodiments, the gripper 225 is configured to mate with the attachment end 220 of the wire comb 215, as shown in more detail in FIGS. 3A-3D. In some embodiments, the gripper 225 has a "V-shaped" end.

In operation, the first micro-robot 200A is secured to a first location. In some embodiments, the first location is on a substrate (such as substrate 105). The second micro-robot 200B may then be slid along the wire comb 215 through the tube 210B of the second micro-robot 200B. In some embodiments, the second micro-robot 200A slides towards the attachment end 220 of the wire comb 215, as shown in FIGS. 2A-2B, such that the gripper 225 contacts the attachment end 220. In some embodiments, an eyelash or cluster of eyelashes (not pictured in FIGS. 2A-2B) is gripped between the gripper 225 and the attachment end 220. The first micro-robot 220A and/or the second micro-robot 200B may then be positioned to apply the eyelash or cluster of eyelashes to an eyelid. In some embodiments, the first micro-robot 220A and the second micro-robot 200B are configured to move together, such that the distance between the first micro-robot 220A and the second micro-robot 200B does not change. Once the micro-robots 200A, 200B are in position, the gripper 225 may be retracted away from the attachment end 220, such as by moving the second micro-robot 200B along the wire comb 215 in the opposite direction. Then, the eyelash or eyelash cluster is applied to the eyelid. In some embodiments, the eyelash or eyelash cluster may include an adhesive, such as eyelash glue. In some embodiments, a user of the system 2000 may apply adhesive, magnetic eyeliner, or the like to their eyes before using system 2000. In some embodiments, the second micro-robot 200B may remain in place for a set period of time (such as 60 seconds) before retracting along the wire comb 215 to ensure the eyelash or cluster of eyelashes remain in place, prior to releasing the eyelash or cluster of eyelashes.

In some embodiments, throughout this operation, the first micro-robot 200A and/or the second micro-robot 200B may slide across a substrate 105, as shown in FIG. 1C. In other embodiments, the first micro-robot 200A and/or the second micro-robot 200B may levitate across a substrate 105, as shown in FIG. 1D. In some embodiments, the first micro-robot 200A and the second micro-robot 200B are configured to slide across or levitate over a flexible substrate, as explained herein.

FIGS. 3A-3F are example grippers and attachment ends of the system 2000 of applying eyelashes of FIGS. 2A-2B, in accordance with the present technology.

Figure 3A:
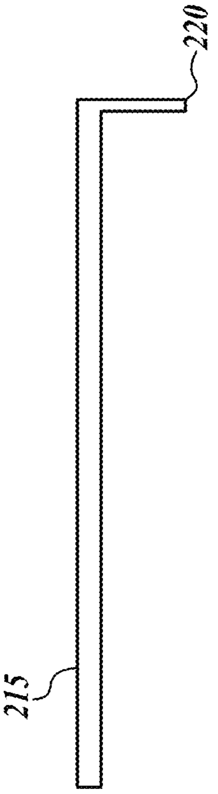
FIGS. 3A-3F are example grippers and attachment ends of the system 2000 of applying eyelashes of FIGS. 2A-2B, in accordance with the present technology.
Figure 3B:
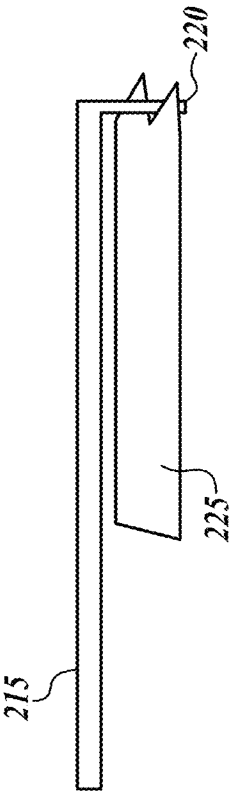
Figure 3C:
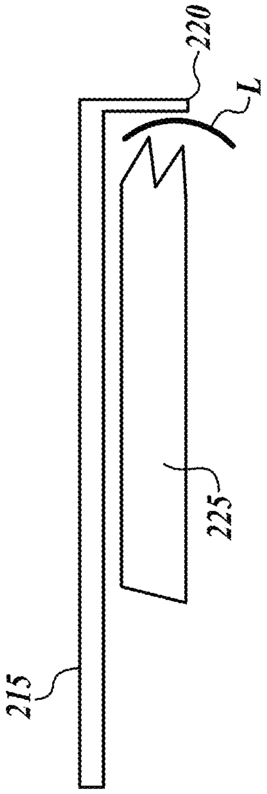
Figure 3D:
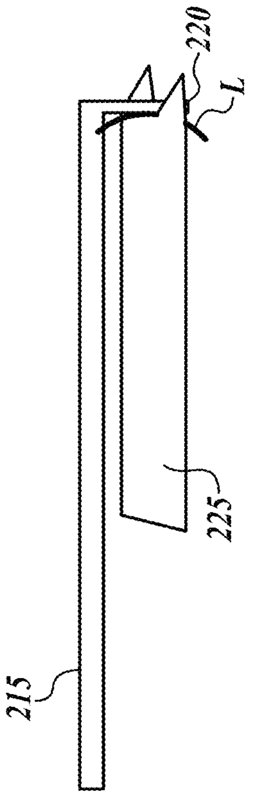
Figure 3E:
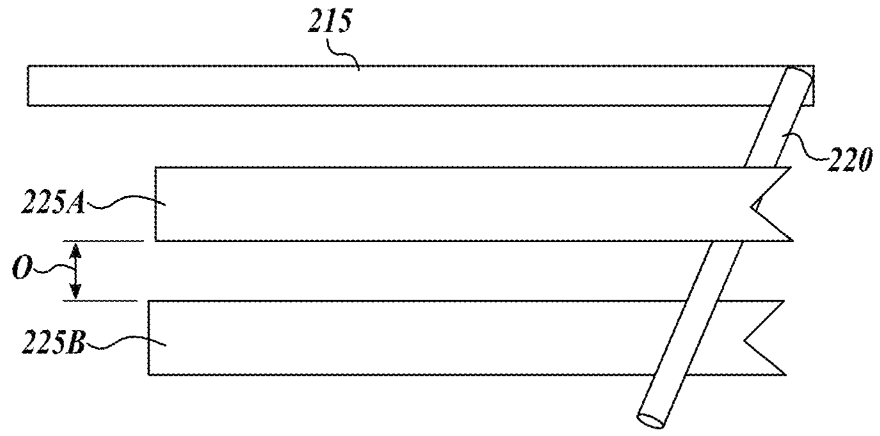
Figure 3F:
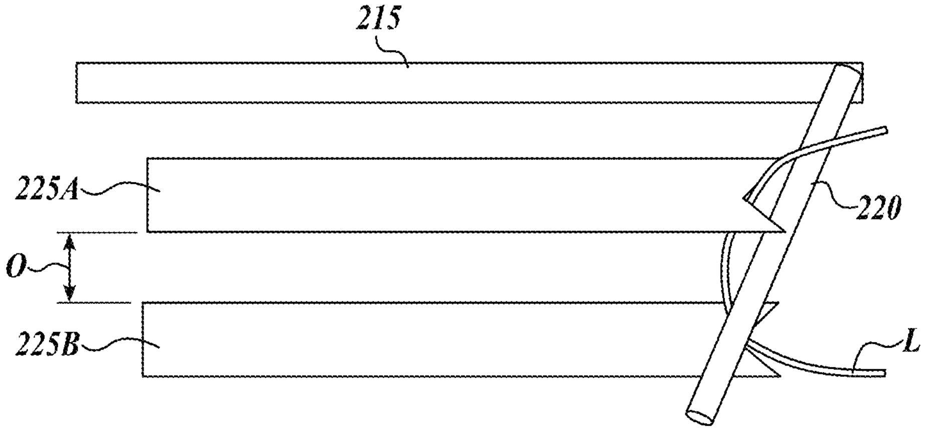

In some embodiments, the system 2000 includes a single gripper 225, as shown in FIGS. 3A-3D. The gripper 225 may move back and forth as the second micro-robot 200B moves along the wire comb. As the gripper 225 moves towards the attachment end 220 of the wire comb 215, a V-shaped end of the gripper 225 contacts and mates with the attachment end 220. As shown in FIGS. 3C-3D, an eyelash L may be gripped between the gripper 225 and the attachment end 220 in this manner.

In some embodiments, the system 2000 includes a first gripper 225A, and a second gripper 225B, as shown in FIGS. 1E-1F. The first gripper 225A and the second gripper 225B may be offset from one another by an offset distance O. In some embodiments, the offset distance is slightly larger than the attachment end 220. In such embodiments, as shown in FIG. 1F, an eyelash L may be gripped by the first gripper 225A, the second gripper 225B, and the attachment end 220. The attachment end 220 may slot into the offset distance O to retain the eyelash L. In some embodiments, both the first gripper 225A and the second gripper 225B have a V-shaped end.

Figure 4A:
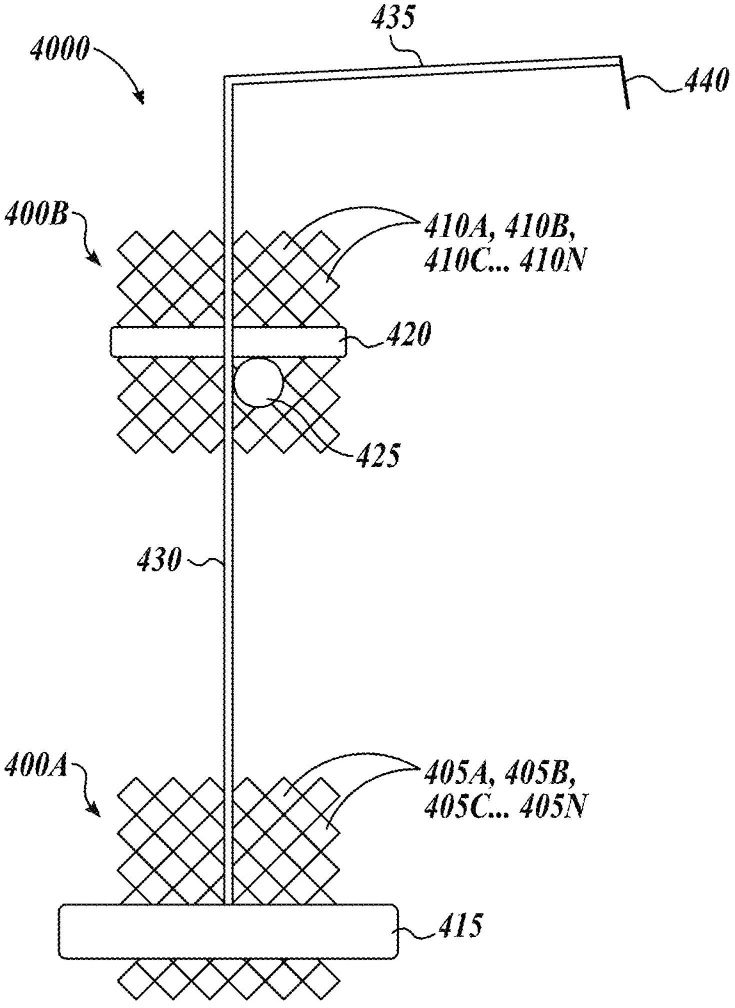
FIGS. 4A-4C are example micro-robot crane systems, in accordance with the present technology.
Figure 4B:
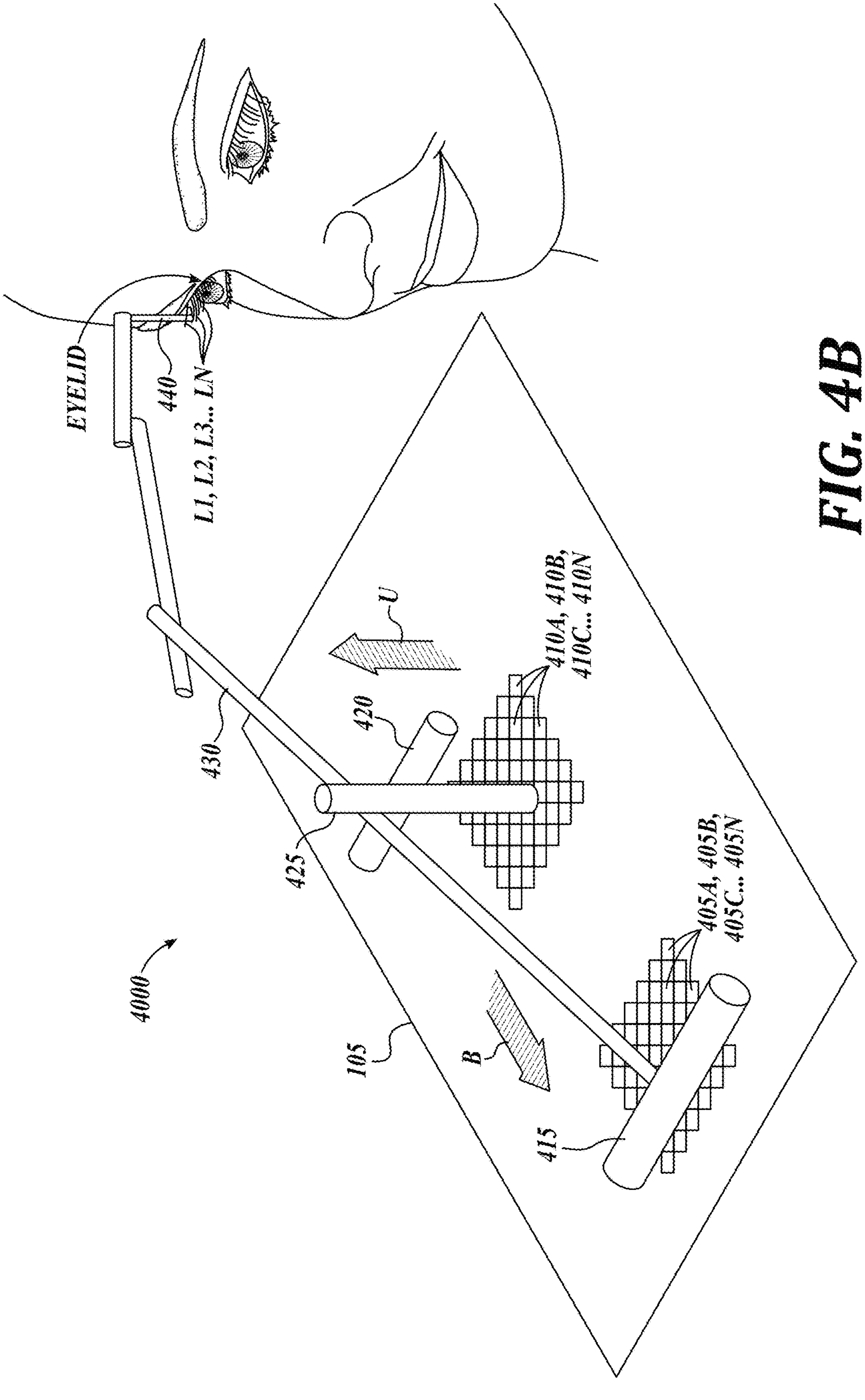
Figure 4C:
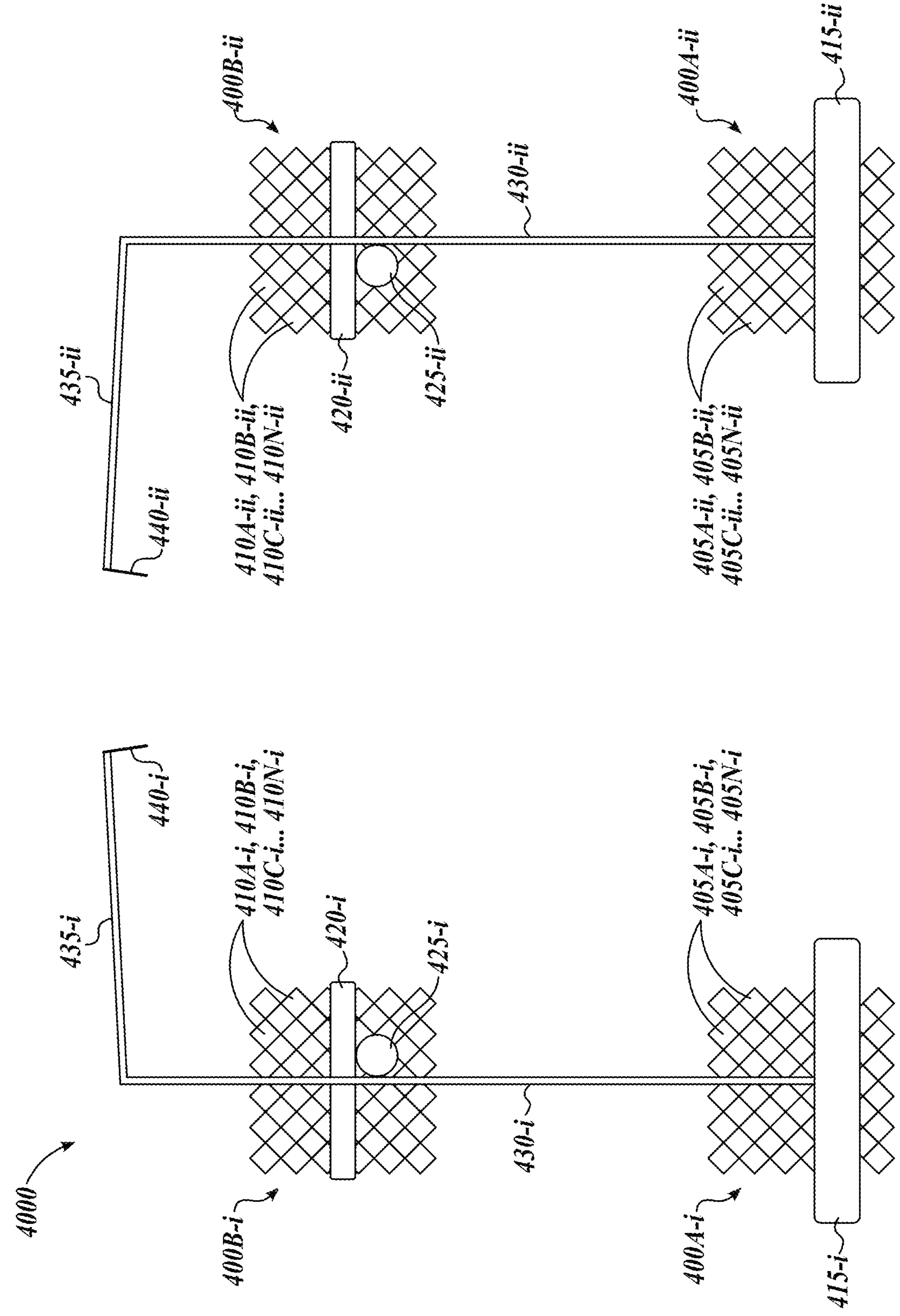

FIGS. 4A-4C are example micro-robot crane systems 4000, in accordance with the present technology. In some embodiments, a system for applying eyelashes includes a robot crane system 4000.

In some embodiments, such as shown in FIGS. 4A-4B, the system 4000 includes a single micro-robot crane. The robot crane system 4000 may include a back micro-robot 400A having a first plurality of magnets 405A, 405B, 405C . . . 405N, a rotary bearing 415, and a separation arm 430 including a separation tip 440. In some embodiments, the robot crane system 4000 further includes a front microrobot 400B having a second plurality of magnets 410A, 410B, 410C . . . 410N, a mount 420, and mechanical stop 425.

In some embodiments, the back micro-robot 400A includes a first plurality of magnets 405A, 405B, 405C . . . 405N. In some embodiments, the first plurality of magnets 405A, 405B, 405C . . . 405N is arranged in an array of alternating magnetization, as explained herein. In some embodiments, the first plurality of magnets 405A, 405B, 405C . . . 405N is a plurality of NdFeB magnets.

In some embodiments, the back micro-robot 400A further includes a rotary bearing 415. The rotary bearing 415 is configured to retain the separation arm 430, and allow the separation arm 430 to move up and down over the mount 420 of the front micro-robot 400B, as shown in FIG. 4B.

In some embodiments, the separation arm 430 includes a separator tip 440 configured to contact a lash line and separate one or more lashes from one another, as shown in FIGS. 4B and 5A-5G. In some embodiments, the separator tip 440 is disposed at an angle from the separator arm 430.

In some embodiments, the front micro-robot 400B includes a second plurality of magnets 410A, 410B, 410C . . . 410N. In some embodiments, the second plurality of magnets 410A, 410B, 410C . . . 410N is arranged in an array of alternating magnetization, as explained herein. In some embodiments, the second plurality of magnets 410A, 410B, 410C . . . 410N is a plurality of NdFeB magnets.

The front micro-robot 400B may further include a mount 420 configured to slide along the separation arm 430. The mount 420 is configured to hold the separation arm 430 and slide backwards and forwards along the separation arm 430 to raise and lower the separation arm 430, as shown in FIG. 4B.

In some embodiments, the front micro-robot 400B further includes a mechanical stop 425, which further retains the separation arm 430. The mechanical stop 425 may prevent the separation arm from disengaging from or falling from the mount 420.

In operation, the back micro-robot 400A may remain stationary. The front micro-robot 400A may move backwards, in direction B. As the front micro-robot 400A moves in direction B, the separation arm 430 is raised upwards with the rotary bearing in the direction U. Because the separation arm 430 contacts mount 420, as the front micro-robot 400A moves backwards, the mount 420 increases an angle between the substrate 105 and the separation arm 430. In this manner, the separation tip 440 can contact a lash line of an eyelid, as shown in FIG. 4B. The separator tip 440 may fit between individual lashes of a plurality of lashes L1, L2, L3 . . . . LN.

Figure 5A:
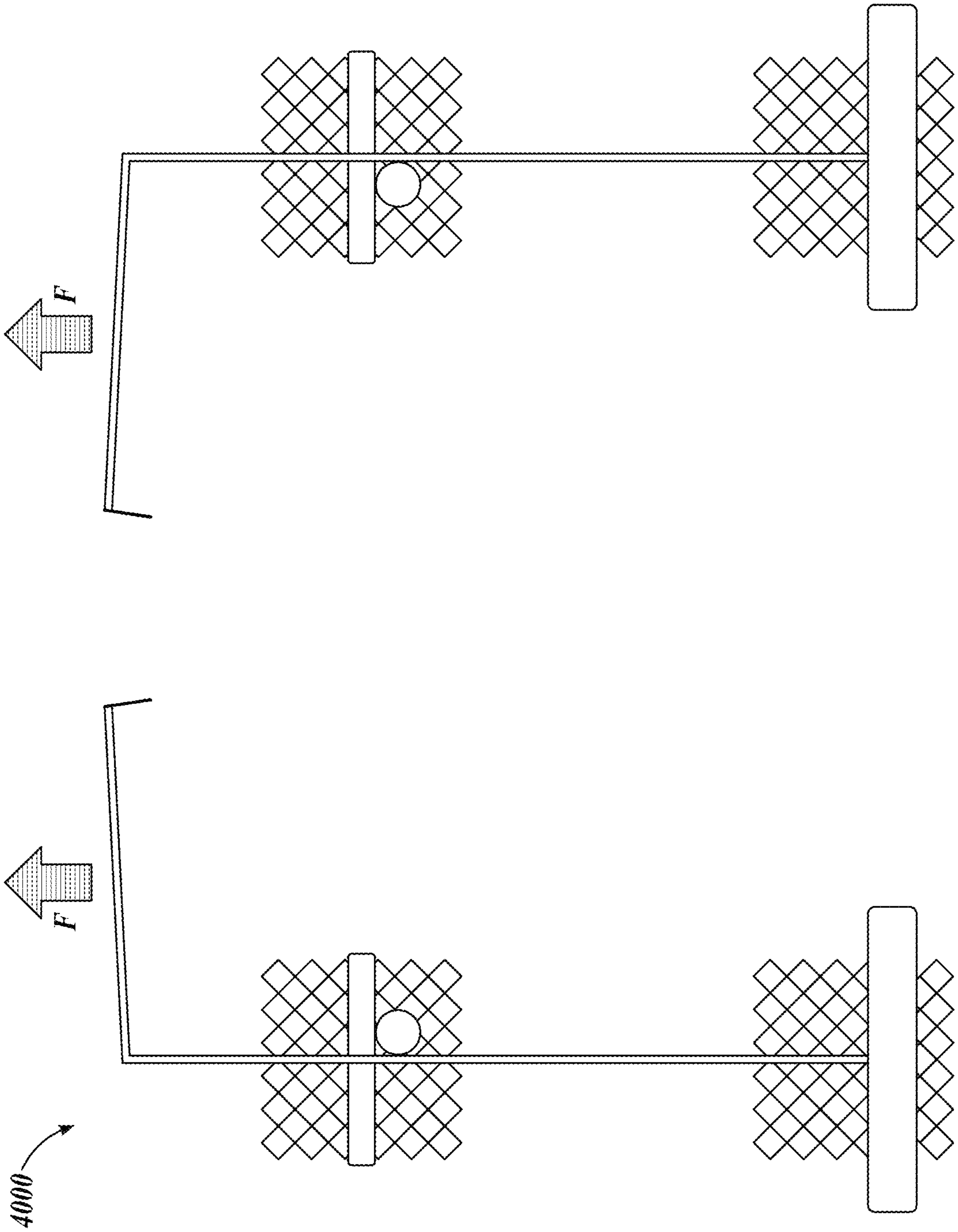
FIGS. 5A-5G are process diagrams of a system of applying eyelashes, in accordance with the present technology.
Figure 5B:
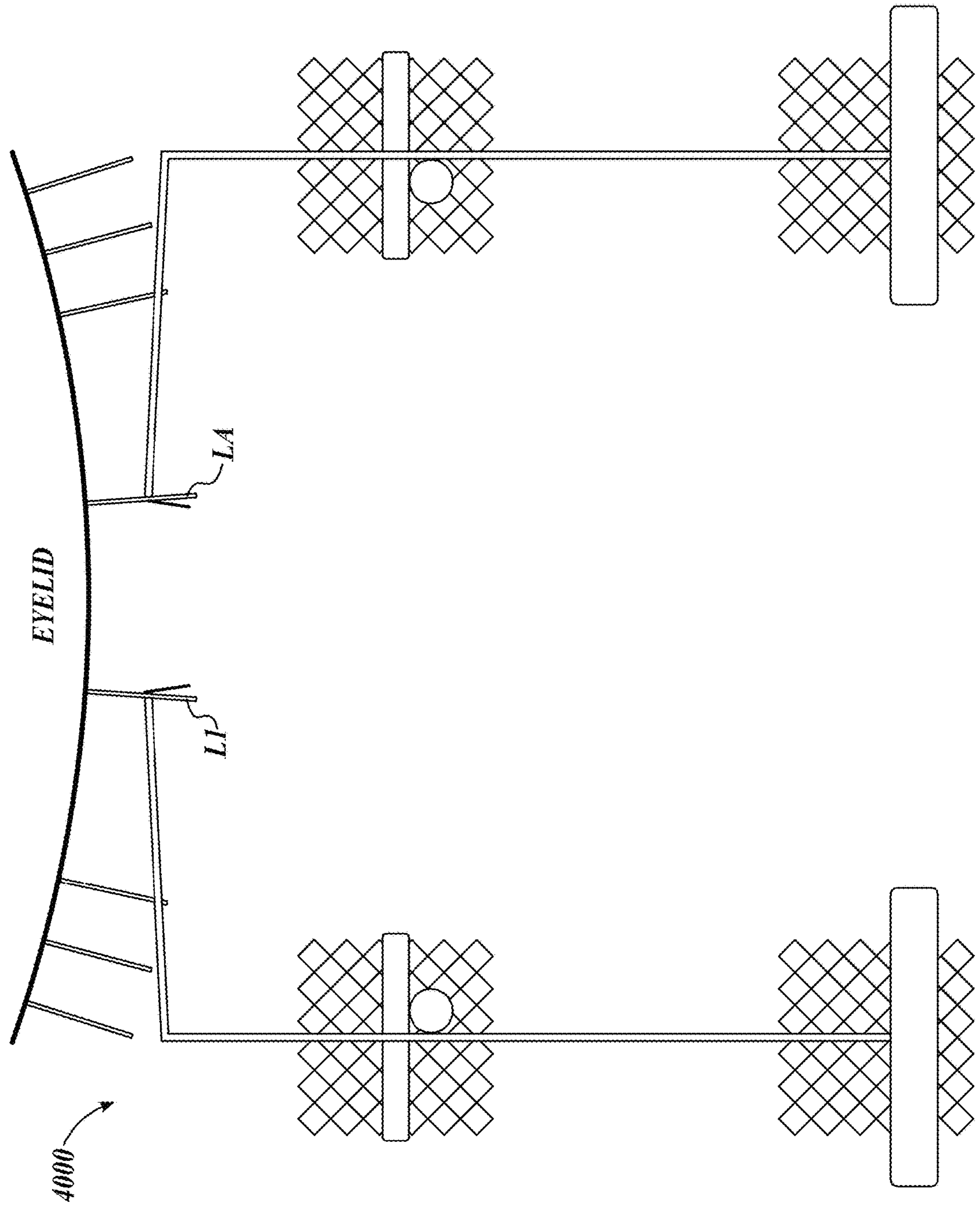
Figure 5C:
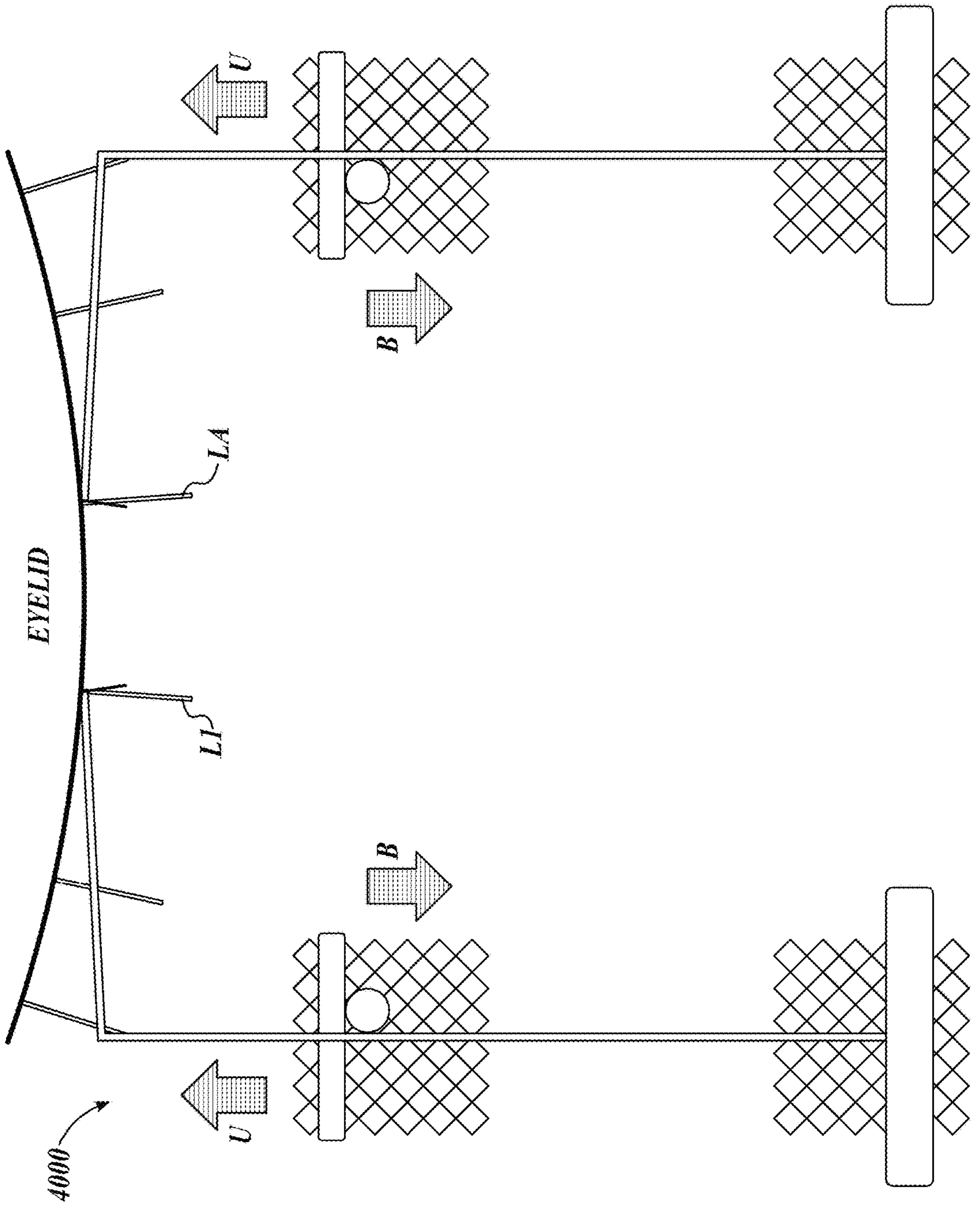
Figure 5D:
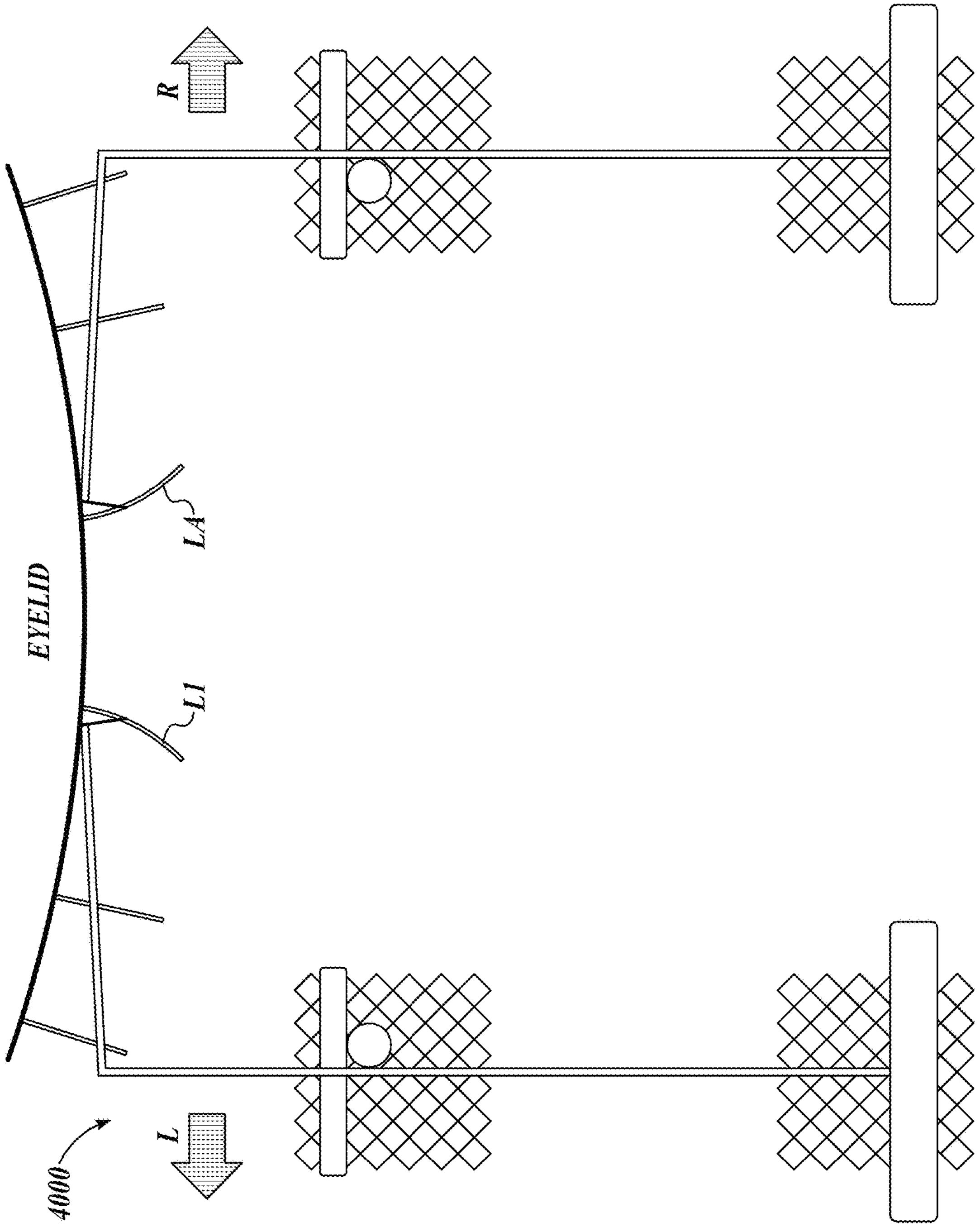
Figure 5E:
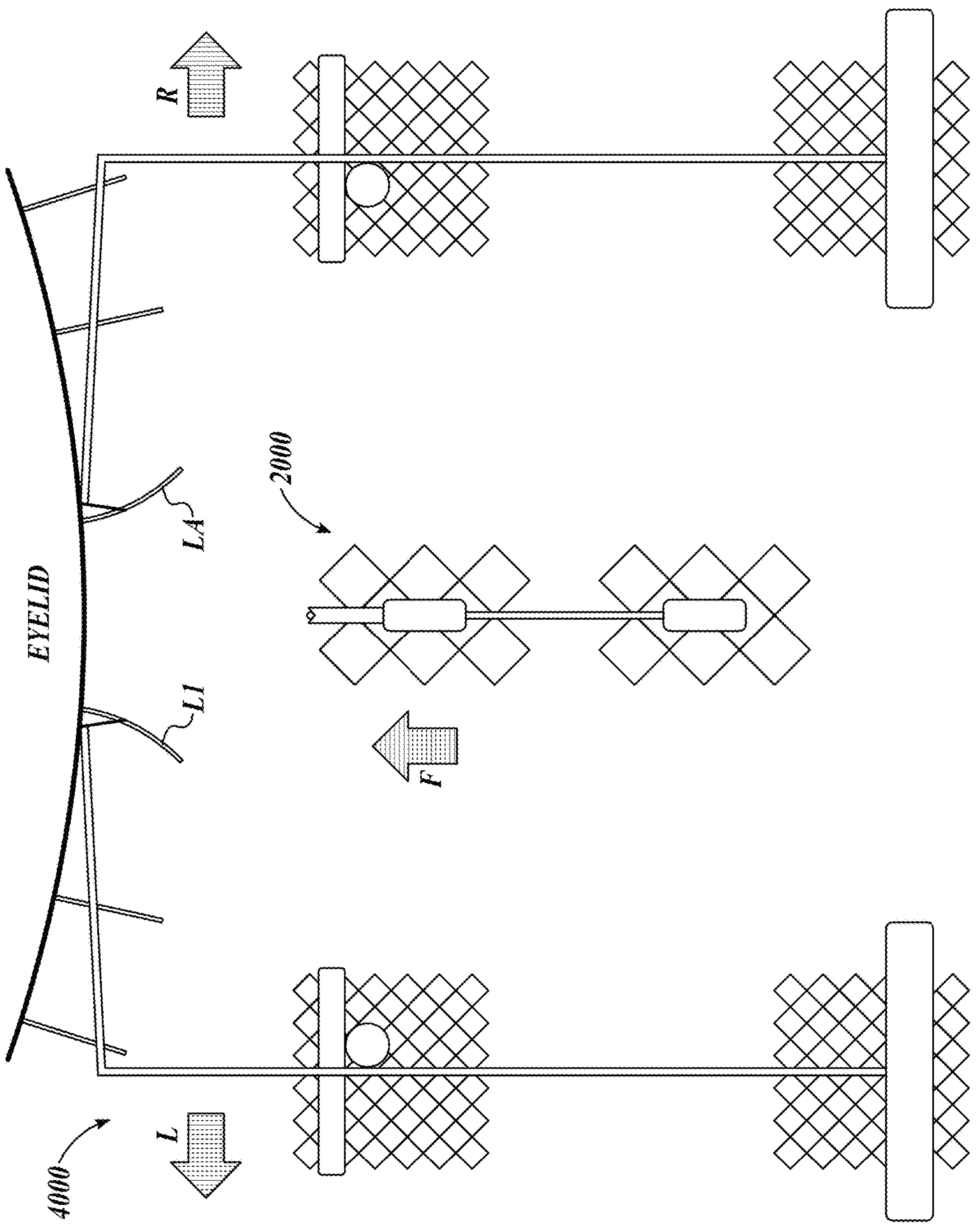

In some embodiments, after contacting the lash line with the separation tip, the back micro-robot 400A and the second micro-robot 400B may move together in a direction perpendicular to direction B to separate adjacent eyelashes, as shown in detail in FIG. 5E.

In some embodiments, throughout this operation, the back micro-robot 400A and/or the front micro-robot 400B may slide across a substrate 105, as shown in FIG. 1C. In other embodiments, the back micro-robot 400A and/or the front micro-robot 400B may levitate across a substrate 105, as shown in FIG. 1D. In some embodiments, the back micro-robot 400A and the back micro-robot 400B are configured to slide across or levitate over a flexible substrate, as explained herein.

In some embodiments, such as shown in FIGS. 4C, the system 4000 includes a first robot crane and a second robot crane. In such embodiments, the system 4000 includes first robot crane having a first back micro-robot 400A-i having a first plurality of magnets 405A-i, 405B-i, 405C-i . . . 405N-i, a first rotary bearing 415-*i*, and a first separation arm 430-*i* including a first separation tip 440-*i*. In some embodiments, the first robot crane further includes a first front micro-robot 400B-i having a second plurality of magnets 410A-i, 410B-i, 410C-i . . . 410N-i, a first mount 420-*i*, and first mechanical stop 425-*i*.

The second robot crane may have a second back micro-robot 400A-ii having a third plurality of magnets 405A-ii, 405B-ii, 405C-ii . . . 405N-ii, a second rotary bearing 415-*ii*, and a second separation arm 430-*ii* including a second separation tip 440-*ii*. In some embodiments, the second robot crane further includes a second front micro-robot 400B-ii having a fourth plurality of magnets 410A-ii, 410B-ii, 410C-ii . . . 410N-ii, a second mount 420-*ii*, and a second mechanical stop 425-*ii*.

As shown in more detail in FIGS. 5A-5G, the first robot crane and the second robot crane may work in tandem to separate adjacent lashes.

FIGS. 5A-5G are process diagrams of a system of applying eyelashes, in accordance with the present technology. In some embodiments, a robot crane system 4000 including a first robot crane and a second robot crane as described herein is used to separate adjacent eyelashes of a user's eye.

In FIG. 5A, both the first robot crane and the second robot crane move together and forwards in the direction F. Both the front micro-robots (such as front micro-robots 400B, 400B-i, 400B-ii) and the back micro-robots (such as back micro-robots 400A, 400A-i, 400-*ii*) move together in the same direction F. In some embodiments, the direction F is towards an eye of a user.

In FIG. 5B, the first robot crane and the second robot crane in robot crane system 4000 reach the eyelid. One skilled in the art should understand that the eyelid and lashes shown in FIG. 5B are not to scale and have been simplified for clarity.

In FIG. 5C, the first front micro-robot of the first crane and the second front micro-robot of the second crane move backwards in the direction B. As this occurs, the first separation arm and the second separation arm move upwards in direction U until the first separation tip and the second separating tip contact a lash line and lashes of the eyelid. The first separating tip contacts a first lash L1, while the second separation tip contacts an adjacent lash LA.

In FIG. 5D, the first micro-robot moves in a first direction L, while the second micro-robot moves in a second direction R, opposite the direction L. In this way, the first lash L1 and the adjacent lash LA are separated by being bent in opposite directions. In some embodiments, this exposes a gap in the lash line of the eye, as shown in FIG. 5D.

In FIG. 5E, a system for applying eyelashes 2000 (as shown and described in FIGS. 2A-3F) moves forwards in direction F, towards the eyelid (and therefore towards the gap in the lash line of the eye, between the first lash L1 and the adjacent lash LA). The gripper of system 2000 may be contacting the attachment end. In this way the gripper and the attachment end may hold an eyelash or cluster of eyelashes between them.

Figure 5F:
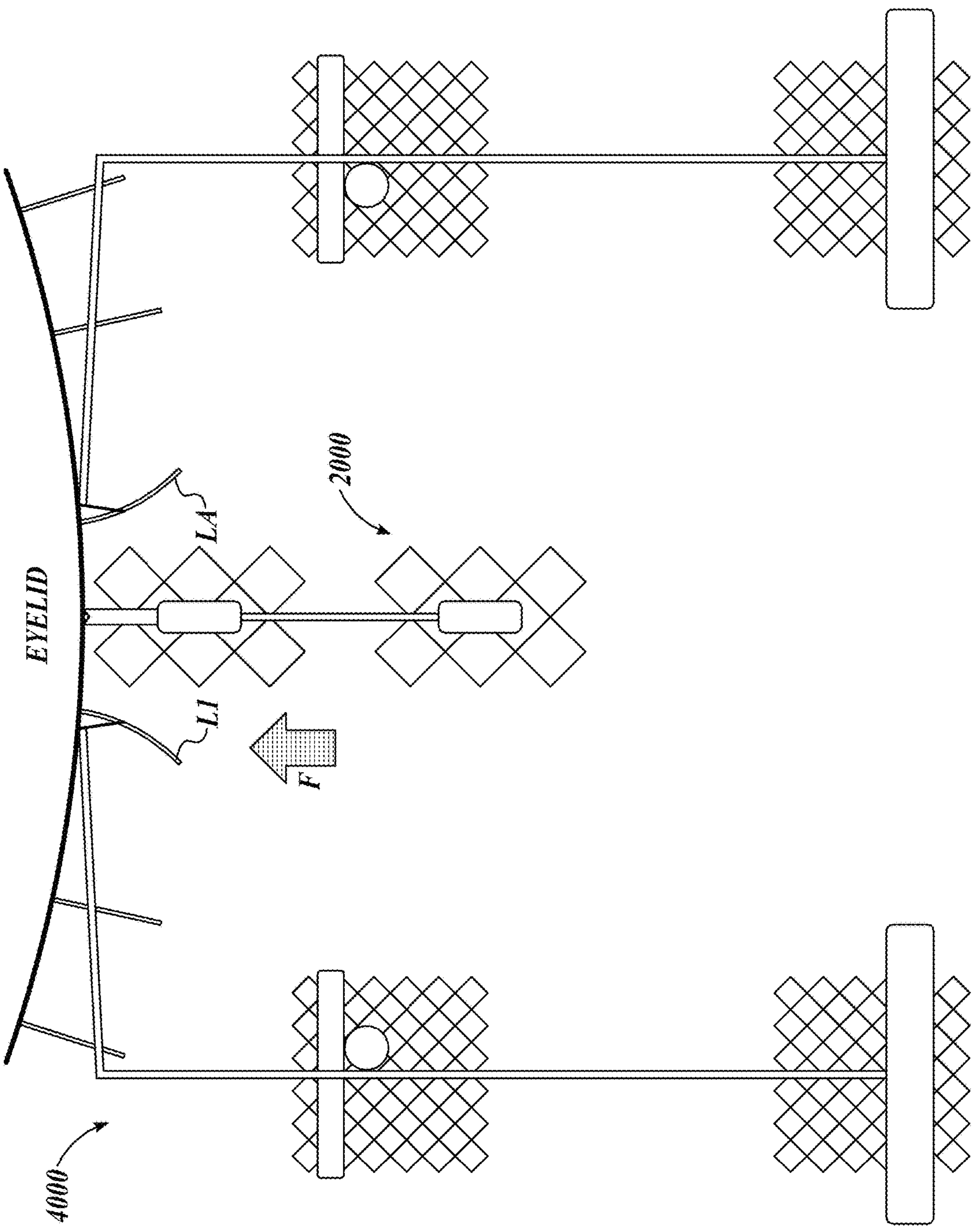

In FIG. 5F, the system 2000 contacts the lash line. The second micro-robot (and therefore the gripper) may move backwards in direction B to release the eyelash or cluster of eyelashes as a new lash (NL) into the gap between the first lash L1 and the adjacent lash LA.

Figure 5G:
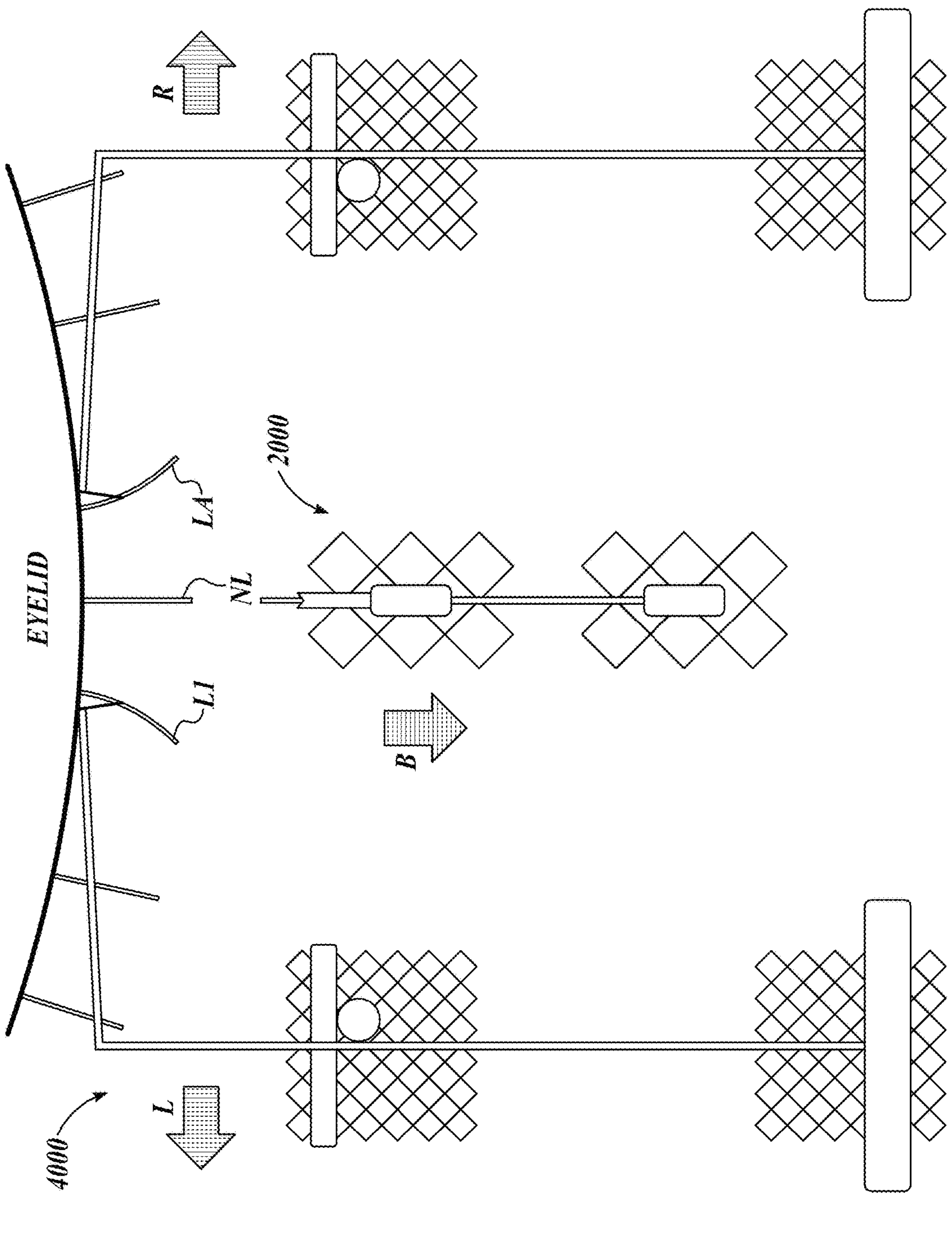

In FIG. 5G, the entire system 2000 moves backwards in direction B, disengaging from the eyelid. A new lash NL has been applied by system 2000.

In some embodiments, throughout this process, the first robot crane, the second robot crane, and/or the system 2000 may slide across a substrate 105, as shown in FIG. 1C. In other embodiments, the first robot crane, the second robot crane, and/or the system 2000 may levitate across a substrate 105, as shown in FIG. 1D. In some embodiments, the first robot crane, the second robot crane, and/or the system 2000 are configured to slide across or levitate over a flexible substrate, as explained herein.

It should be understood that in some embodiments, lashes may be applied to both eyes of a user, such as with a third robot crane, a fourth robot crane, and a second system 2000. In some embodiments, eyelashes may be applied to both eyes concurrently or sequentially. In some embodiments, after applying lashes to the first eye, the systems 2000, 4000 shown in FIGS. 5A-5F may move to the second eye of a user. In other embodiments, a user may adjust so that the systems 2000, 4000 are near their second eye.

FIGS. 6A-6E are example systems 100 for applying eyelashes, in accordance with the present technology.

Figure 6A:
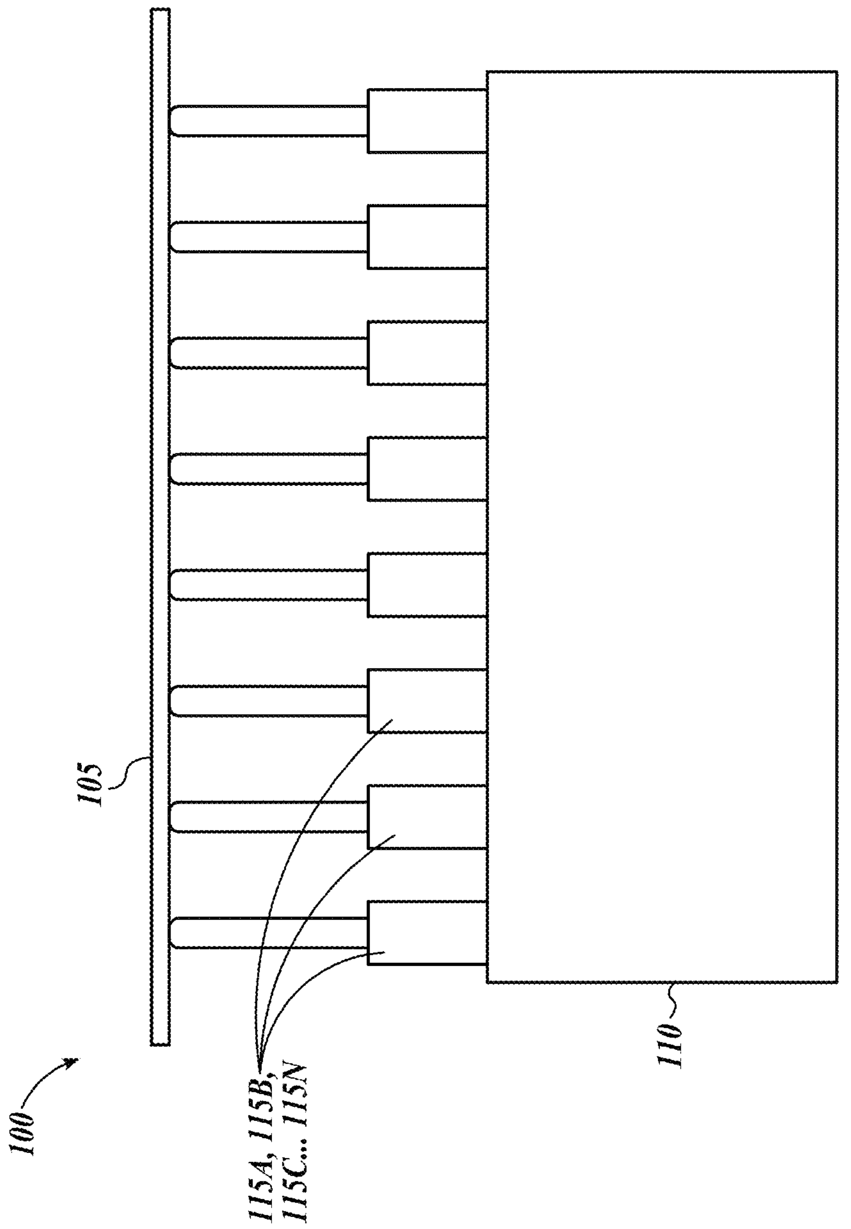
FIGS. 6A-6E are example systems for applying eyelashes, in accordance with the present technology.

As shown in FIG. 6A, the system 100 may include a flexible printed circuit board (PCB) substrate 105, a motor base 110, and one or more linear actuators 115A, 115B, 115C . . . 115N (also referred to herein as a plurality of linear actuators). In some embodiments, the flexible PCB 105 substrate is configured to bend and/or curve in response to the one or more linear actuators 115A, 115B, 115C . . . 115N (which may be referred to herein as "adjusting" the PCB substrate 105).

In some embodiments, the motor base 110 is disposed below the flexible PCB substrate 105. The motor base 100 is coupled to the one or more linear actuators 115A, 115B, 115C . . . 115N and is configured to drive and direct the one or more linear actuators 115A, 115B, 115C . . . 115N to move up and down to adjust the PCB substrate 105.

Figure 6B:
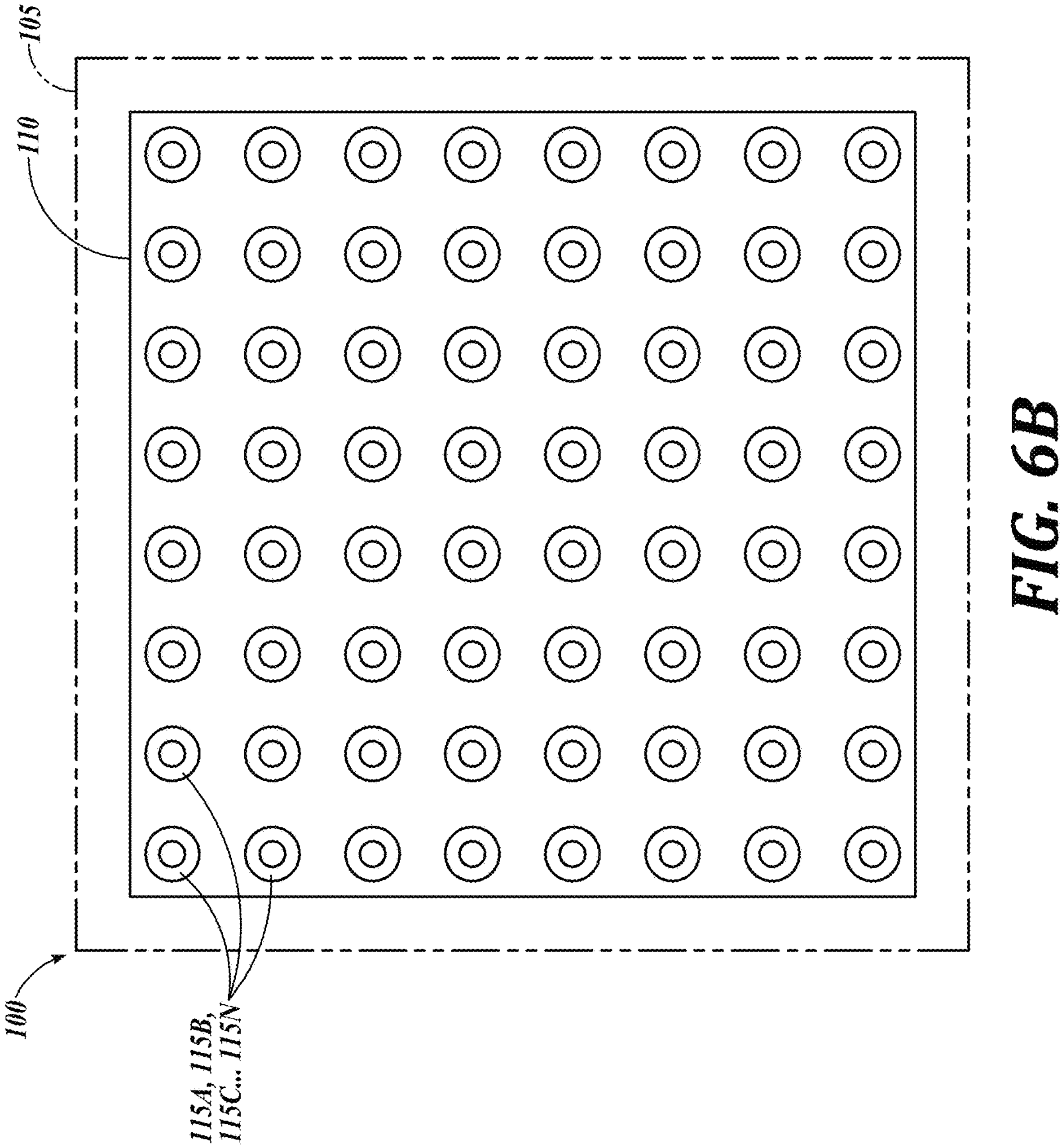

FIG. 6B is a top-down perspective of the system 100. The flexible PCB substrate 105 may be disposed on top of a plurality of linear actuators 115A, 115B, 115C . . . 115N. The flexible PCB substrate 105 is shown as dashed lines in FIG. 6B to better shown the position of the plurality of linear actuators 115A, 115B, 115C . . . 115N.

In some embodiments, the plurality of linear actuators 115A, 115B, 115C . . . 115N are disposed in an array. Each linear actuator of the plurality of linear actuators 115A, 115B, 115C . . . 115N may move independently, allowing for numerous adjustments to the flexible PCB substrate 105.

Figure 6C:
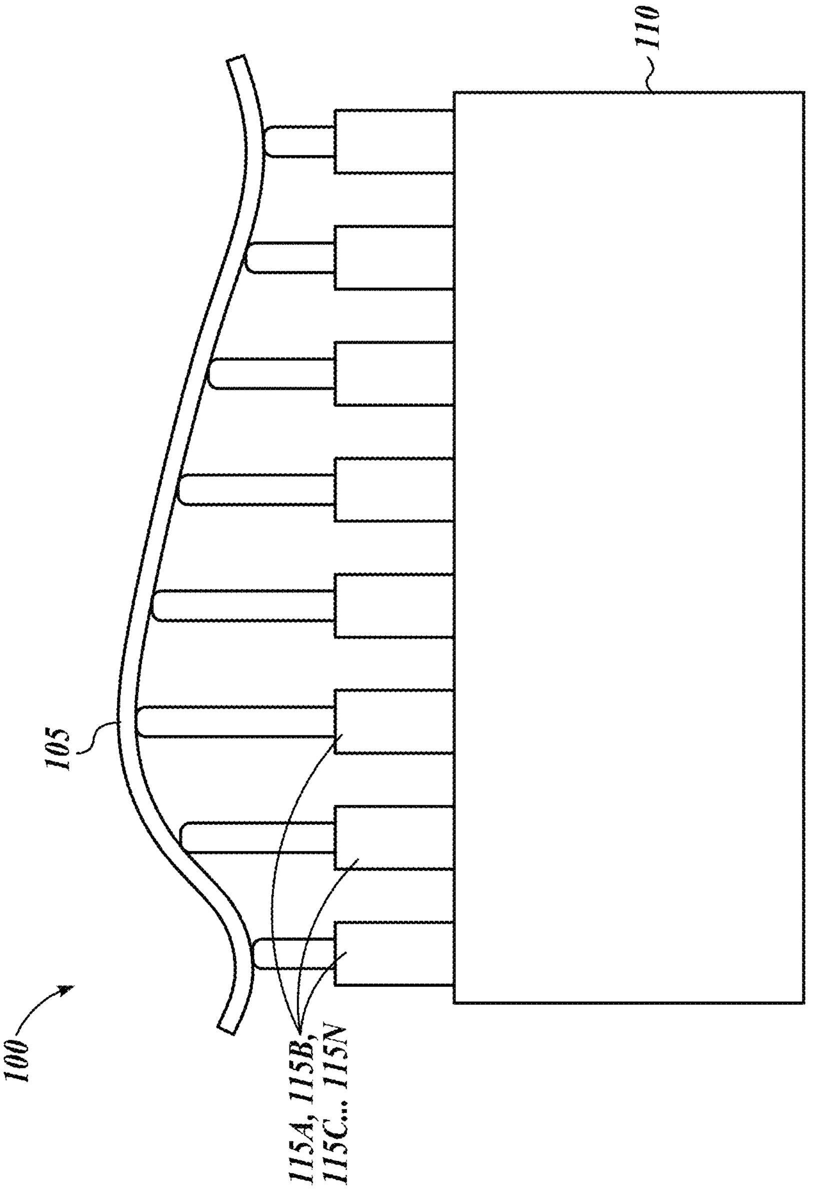

FIG. 6C shows a system 100 where the plurality of linear actuators 115A, 115B, 115C . . . 115N have adjusted the flexible PCB substrate 105. In operation, each linear actuator of the plurality of linear actuators 115A, 115B, 115C . . . 115N moves independently to bend, curve, and otherwise manipulate the flexible PCB substrate 105.

Figure 6D:
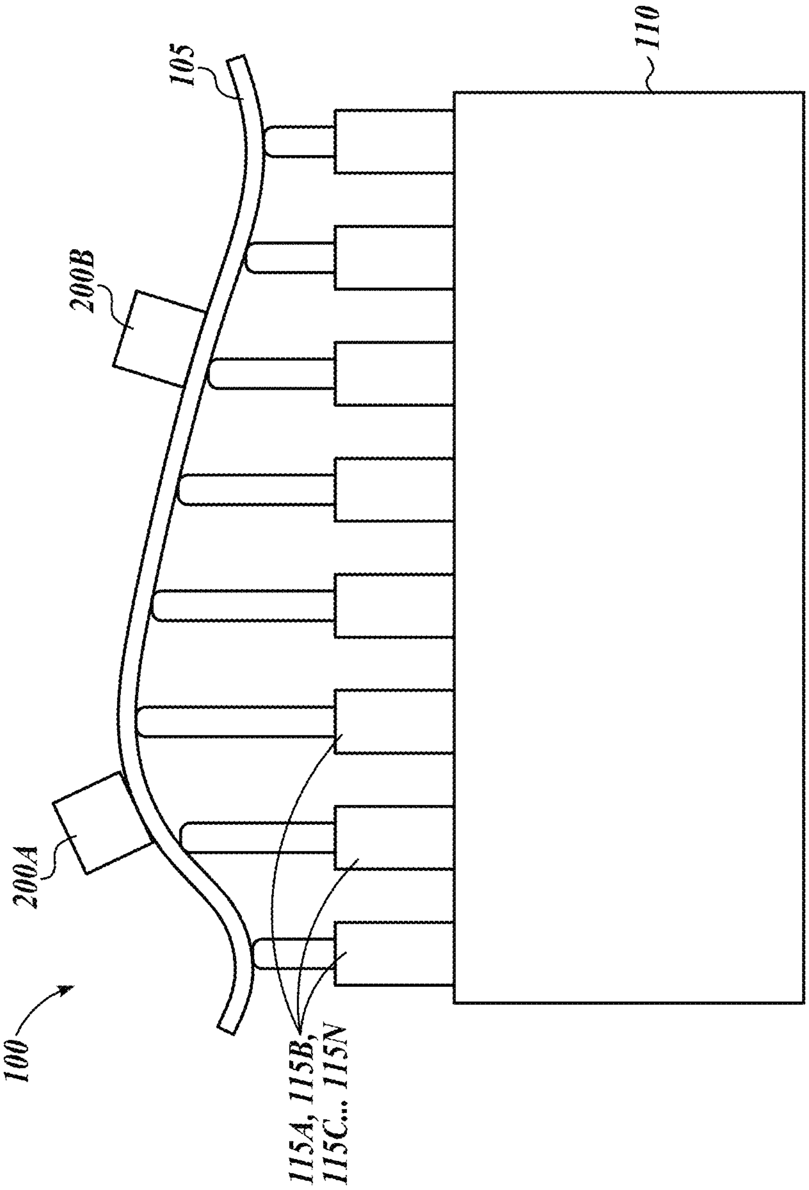

In operation, as shown in FIG. 6D, one or more micro-robots 200A, 200B may slide (such as shown in FIG. 1C) or levitate (such as shown in FIG. 1D) over the flexible PCB substrate 105. In some embodiments, the flexible PCB substrate 105 is adjusted before the one or more micro-robots 200A, 200B move over it. In other embodiments, the flexible PCB substrate 105 may be adjusted dynamically, that is, while the one or more micro-robots 200A, 200B are in motion. While the one or more micro-robots 200A, 200B are illustrated as squares for simplicity, it should be understood that the one or more micro-robots may be any of the micro-robots or micro-robot systems shown and described herein (such as micro-robots 200, first micro-robot 200A, second micro-robot 200B, system 2000, back micro-robots 400A, 400A-i, 400A-ii, front micro-robots 400B, 400B-i, 400B-ii, and system 4000). In some embodiments, the flexible PCB substrate 105 is configured to adjust a pitch, a yaw, a roll, or a combination thereof of the one or more micro-robots 200A, 200B.

Figure 6E:
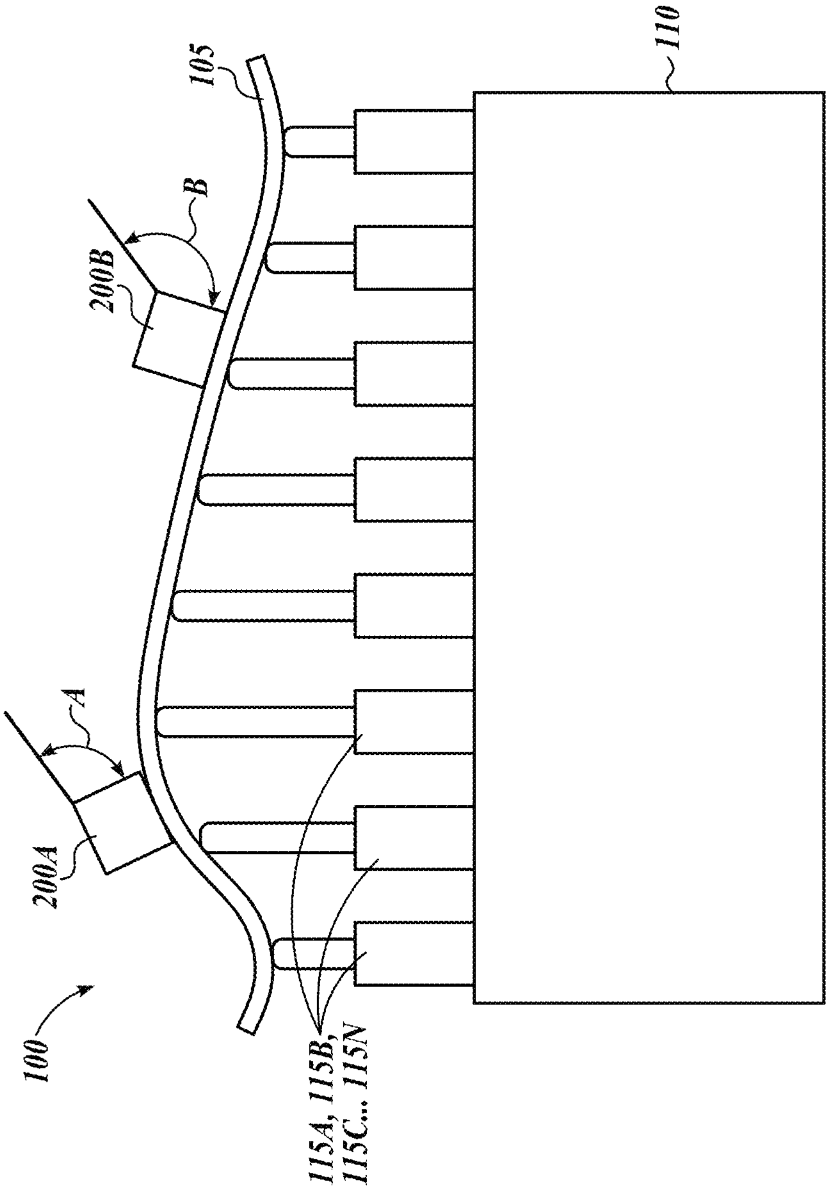
Figure 7A:
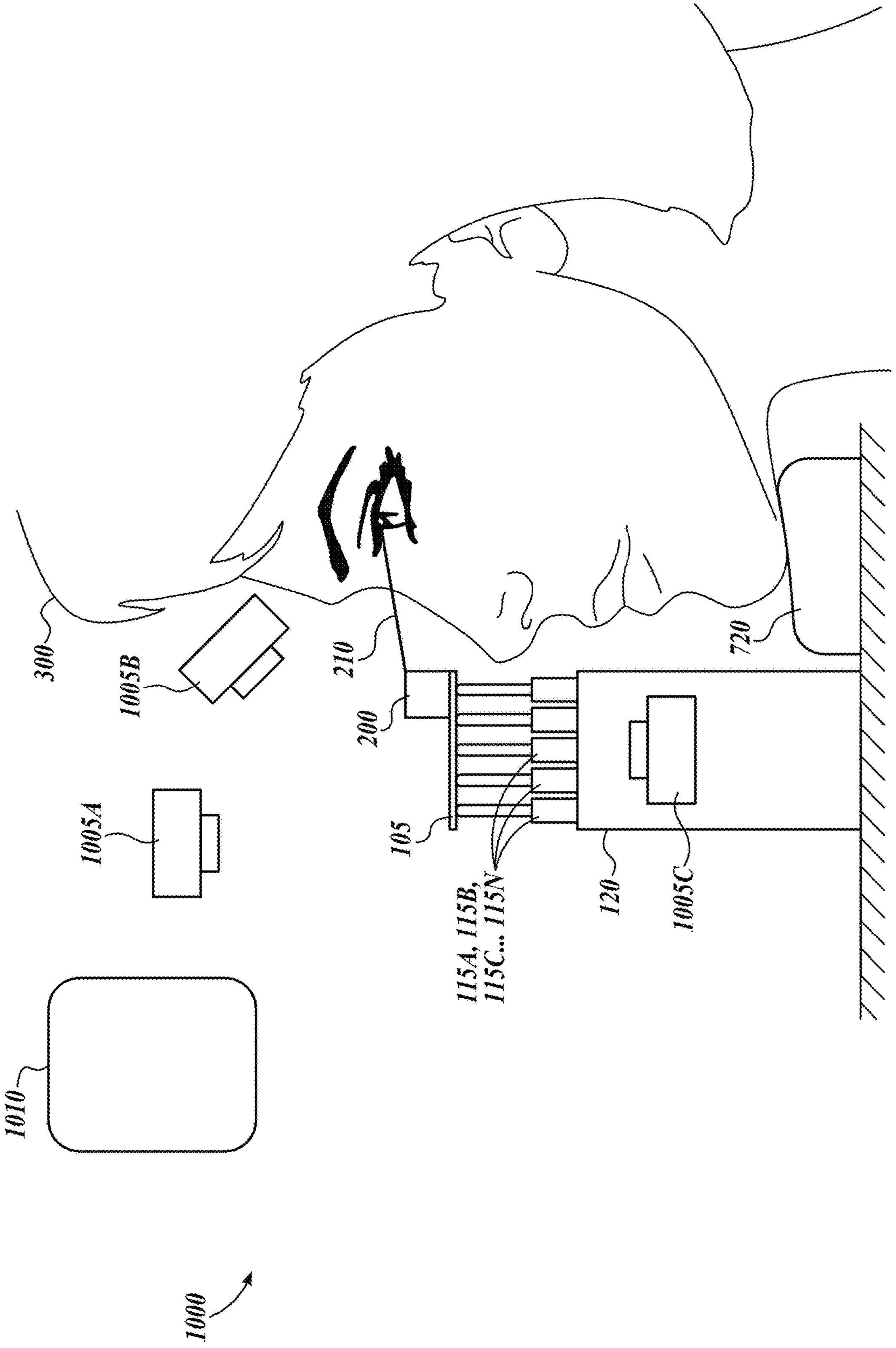
FIGS. 7A-7B show another example system 1000 for applying eyelashes, in accordance with the present technology.
Figure 7B:
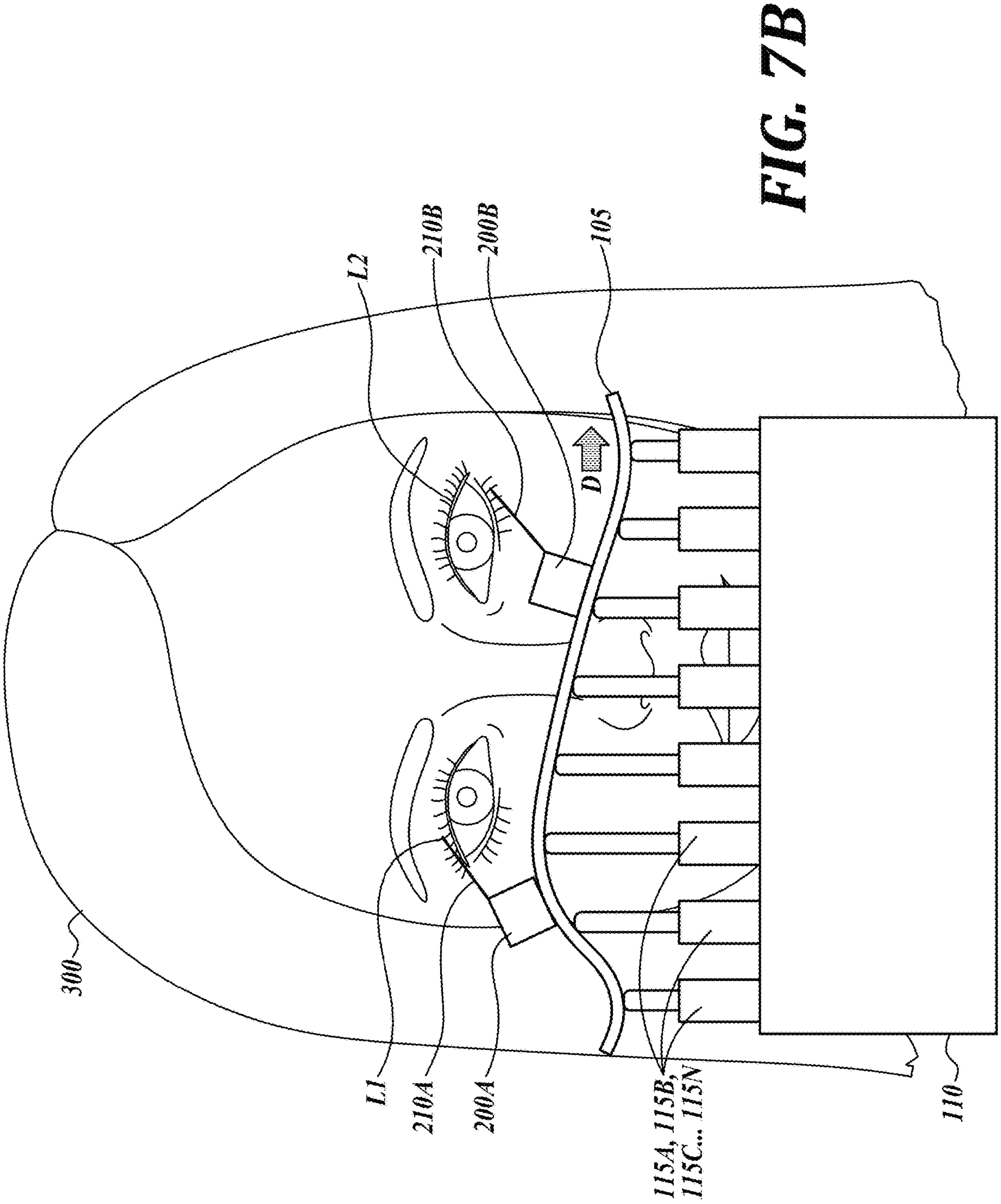

FIG. 6E shows one or more micro-robots 200A, 200B having applicators. As the one or more micro-robots 200A, 200B move across the flexible PCB substrate 105, an angle A, B between the applicator and the flexible PCB substrate 105 changes. In some embodiments, the applicators are disposed at an angle. In some embodiments, these angles A, B are referred to as "angles of attack," meaning that angles A, B allow for the applicators to apply an eyelash to a user's eye, as shown in FIGS. 7A-7B. In such embodiments, the flexible PCB substrate is configured to adjust the angle of attack of the applicators. As shown herein, the applicators may be any of the applicators described herein, such as applicator 210, attachment end 220, separating tip 440, and the like.

FIGS. 7A-7B show another example system 1000 for applying eyelashes, in accordance with the present technology. In some embodiments, the system 1000 includes a flexible PCB substrate 105, a plurality of linear actuators 115A, 115B, 115C . . . 115N, a motor base 120, one or more micro-robots 200, a chin rest 720, one or more cameras 1005A, 1005B, 1005C, (collectively a "camera system" 1005) and a processor 1010. A user 300 may use the system 1000 as shown in FIGS. 7A-7B.

While the one or more micro-robots 200A, 200B are illustrated as squares for simplicity, it should be understood that the one or more micro-robots may be any of the micro-robots or micro-robot systems shown and described herein (such as micro-robots 200, first micro-robot 200A, second micro-robot 200B, system 2000, back micro-robots 400A, 400A-i, 400A-ii, front micro-robots 400B, 400B-i, 400B-ii, and system 4000). In some embodiments, the flexible PCB substrate 105 is configured to adjust a pitch, a yaw, a roll, or a combination thereof of the one or more micro-robots 200A, 200B.

Applicator 210 may be disposed at an angle. As explained herein, the applicator 210 may be any of the applicators described herein, such as applicator 210 of FIG. 1B, attachment end 220, separating tip 440, and the like.

In some embodiments, the system 1000 includes one or more camera 1005A, 1005B, 1005C. While three cameras are shown in FIGS. 7A-7B, it should be understood that any number of cameras may be used as a camera system, including a single camera. In some embodiments, the one or more cameras 1005A, 1005B, 1005C are configured to analyze a user 300, the one or more micro-robots 200, and the flexible PCB substrate 105. In some embodiments, the one or more cameras 1005A, 1005B, 1005C are communicatively coupled with a processor 1010. The processor may be configured to determine a desired height of the one or more linear actuators 115A, 115B, 115C . . . 115N, a new position of the one or more micro-robots, or both. In this manner, the one or more cameras 1005A, 1005B, 1005C can determine a location of each element and correctly position the flexible PCB substrate 105, the one or more micro-robots 200, the applicator 210, or a combination thereof with the processor 1010. While the processor 1010 is shown above the system 1000, it should be understood that the processor may be located anywhere, including incorporated directly into the system. In some embodiments, the processor 1010 may be a remote processor or else incorporated into a remote device such as a smart phone, desktop computer, laptop, or tablet. In some embodiments, the processor 1010 is configured to communicatively couple with the one or more cameras 1005A, 1005B, 1005C, the motor base 120, the one or more linear actuators 115A, 115B, 115C . . . 115N, and/or the one or more micro-robots 200.

In some embodiments, positioning the one or more micro-robots 200 onto the flexible PCB substrate 105 includes directing the one or more micro-robots 200 to slide or levitate over the flexible PCB substrate 105. In some embodiments, positioning the one or more micro-robots includes adjusting a pitch, yaw, roll, or a combination thereof of the one or more micro-robots 200 with the one or more linear actuators 115A, 115B, 115C . . . 115N under the flexible PCB substrate 105. Adjusting the position of the one or more micro-robots in one of or both of the ways described above allows the system 1000 to apply an eyelash with the one or more micro-robots 200.

In operation, a user 300 may rest their chin on the chin rest 720. In some embodiments, the chin rest 720 may be omitted. In some embodiments, the chin rest is adjustable to position the user 3000 to a location where the one or more micro-robots 200 can contact the user's lash line, eyelid, or the like. The one or more cameras 1005A, 1005B, 1105C may monitor the position, orientation, and/or angle of the one or more micro-robots 200. The one or more cameras 1005A, 1005B, 1005C may also determine a location of features of the user 3000 such as the eyes, lash lines, eyelashes, and eyelids.

In some embodiments, the first camera 1005A is positioned to view the flexible PCB substrate 105 from a top-down (or "bird's eye" view), the second camera 1005B is positioned to view the flexible PCB substrate 105 from an angle, and the third camera 1005C is positioned to view the flexible PCB substrate 105 from the side. However, one skilled in the art will recognize that the camera system 1005 may take any configuration.

In some embodiments, the one or more cameras 1005A, 1005B, 1005C transmit image data of the one or more micro-robots 200, the flexible PCB substrate 105, and/or the user 300 to the processor 1010. The processor may then analyze this image data and adjust a height of at least one linear actuator of the plurality of linear actuators 115A, 115B, 115C . . . 115N and/or adjust a position of the one or more micro-robots 200. In some embodiments, adjusting the position of the one or more micro-robots 200 comprises adjusting an angle of attack of the applicator 210 of the one or more micro-robots 200 with the plurality of linear actuators 115A, 115B, 115C . . . 115N.

In some embodiments, as shown in FIG. 7B, the processor 1010, in conjunction with the flexible PCB substrate 105 may position a first micro-robot 200A to apply a first eyelash L1 and position a second micro-robot 200B to apply a second eyelash L2. In such embodiments, the first micro-robot 200A and the second micro-robot 200B may move along the flexible PCB substrate in direction D, applying eyelashes as they pass the a user's first (left) eye. In some embodiments, the one or more micro-robots 200A, 200B may apply eyelashes contemporaneously. For example, the first micro-robot 200A may apply eyelashes to the user's first (left) eye and the second micro-robot 200B may apply eyelashes to the user's second (right) eye. In some embodiments, the flexible PCB substrate 105 may adjust the position of the one or more micro-robots 200A, 200B such that applicators 210A, 210B are able to apply eyelashes or eyelash clusters to a top lash line, a bottom lash line, or both.

In operation, a user 3000 may select an eyelash style, such as with an application on a communicatively coupled smart phone, a tablet, or a computer. In some embodiments, the smart phone, tablet, or computer houses the processor 1010. The user 3000 may modify their selection, view their selection on a photo or live feed of themselves, or receive a selection based on a questionnaire, personal preferences, or trending styles. After selecting the style, the user 3000 may then sit or stand at the system 1000. In some embodiments, the user 3000 rests their chin on the chin rest 720. The processor 1010 may then direct the one or more micro-robots 200 to apply one or more eyelashes or eyelash clusters to achieve the selected style. The one or more cameras 1005A, 1005B, 1005C monitor the one or more micro-robots 200 and the user 3000 to ensure the one or more micro-robots 200 are directed to a location capable of applying the one or more eyelashes or eyelash clusters to achieve the selected style. In some embodiments, the processor 1010 further instructs the one or more linear actuators 115A, 115B, 115C . . . 115N to adjust the flexible PCB substrate 105 to further position the one or more micro-robots 200.

Figure 8:
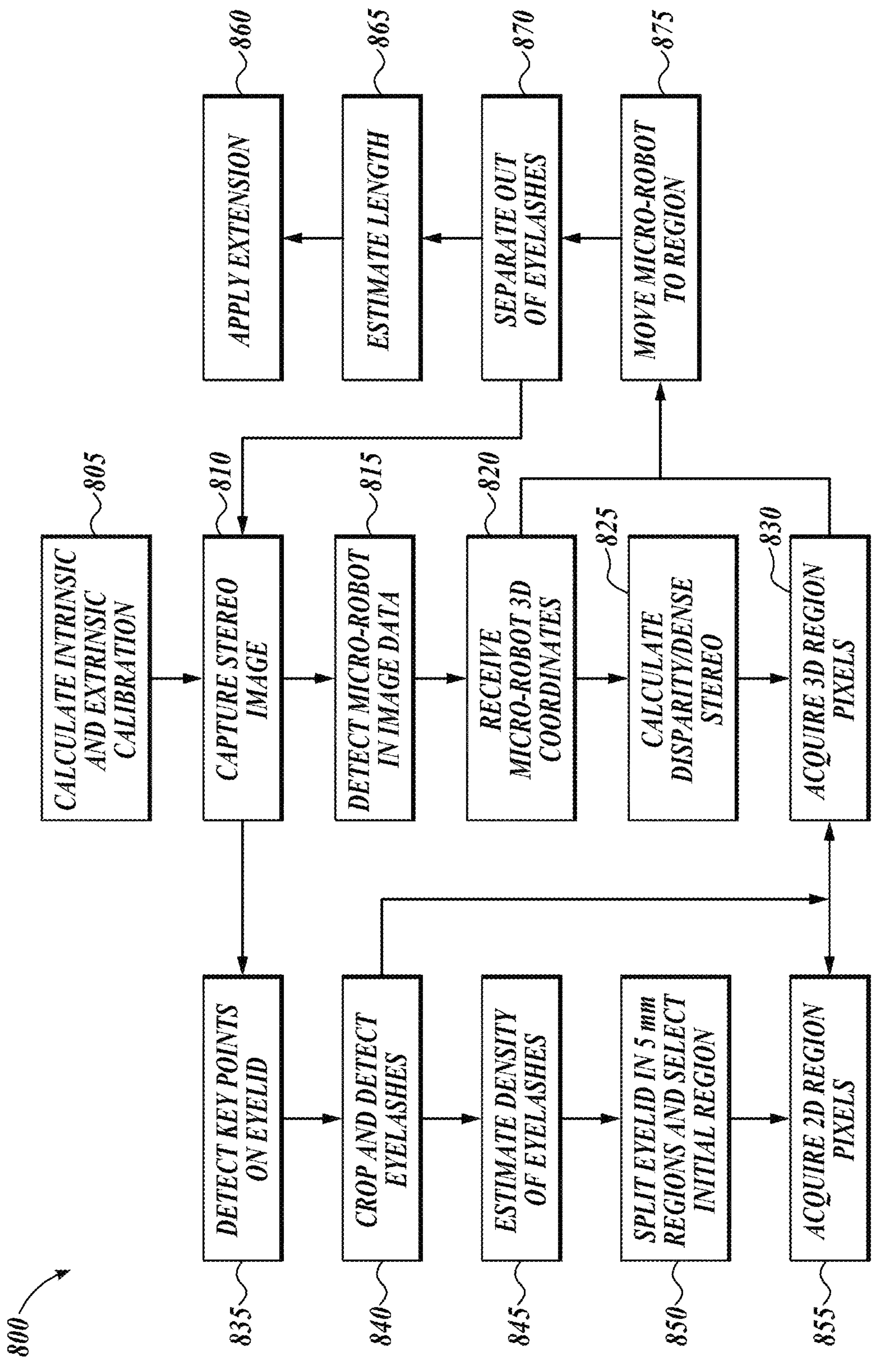
FIG. 8 is a block diagram of an example system for applying eyelashes, in accordance with the present technology.

FIG. 8 is a block diagram of an example system 800 for applying eyelashes, in accordance with the present technology.

In block 805, the system 800 may calculate intrinsic and extrinsic calibration of the system 800. In some embodiments, this is only done once. In some embodiments, calculating the intrinsic and extrinsic calibration includes determining an initial position of a flexible PCB substrate (such as flexible PCB substrate 105) one or more micro-robots (such as micro-robots 200, 200A, 200B, 400A, 400B, 400A-i, 400B-i, 400B-ii, and 400B-ii), and/or a user (such as user 300) of the system 800.

In block 810, stereo image is captured. In some embodiments, this is done with a camera system (such as camera system 1005, including one or more cameras 1005A, 1005B, 1005C).

In block 815, one or more micro-robots are detected in the stereo image (or image data). This allows system 800 to determine and receive three-dimensional (3D) coordinates of the one or more micro-robots. These coordinates may be referred to as the one or more micro-robot's position.

In block 820, a dense disparity map of the stereo images is generated. In some embodiments, generating the dense disparity map includes dynamic programming, where edge pixels of the stereo images are matched and a dense disparity map is obtained by filling in the spaces between two consecutive edge pixels.

In block 830, 3D region pixels are acquired.

Returning to block 810, after obtaining the stereo images, contemporaneously, key points of the eyelid may be detected in the stereo images in block 835.

In block 840, the eyelashes of an eye (or both eyes) are cropped and detected.

In block 845, a density of the eyelashes is estimated.

In block 850, the eyelid is split into 5 mm regions, and an initial region for eyelash application is selected.

In block 855, two-dimensional (2D) regions of pixels of the eyelid are acquired. In conjunction with the 3D region of pixels of the desired position of the one or more micro-robots of block 830, the one or more micro-robots can be moved to a correct region in block 875.

In block 870, eyelashes may be separated out be the one or more micro-robots and visualized again in block 810. The stereo images of the separated out eyelashes may go through the same processing steps in blocks 810-855.

In block 865, the length of the eyelashes may be estimated.

In block 860, the extension (eyelash and/or eyelash cluster) is applied.

Figure 9A:
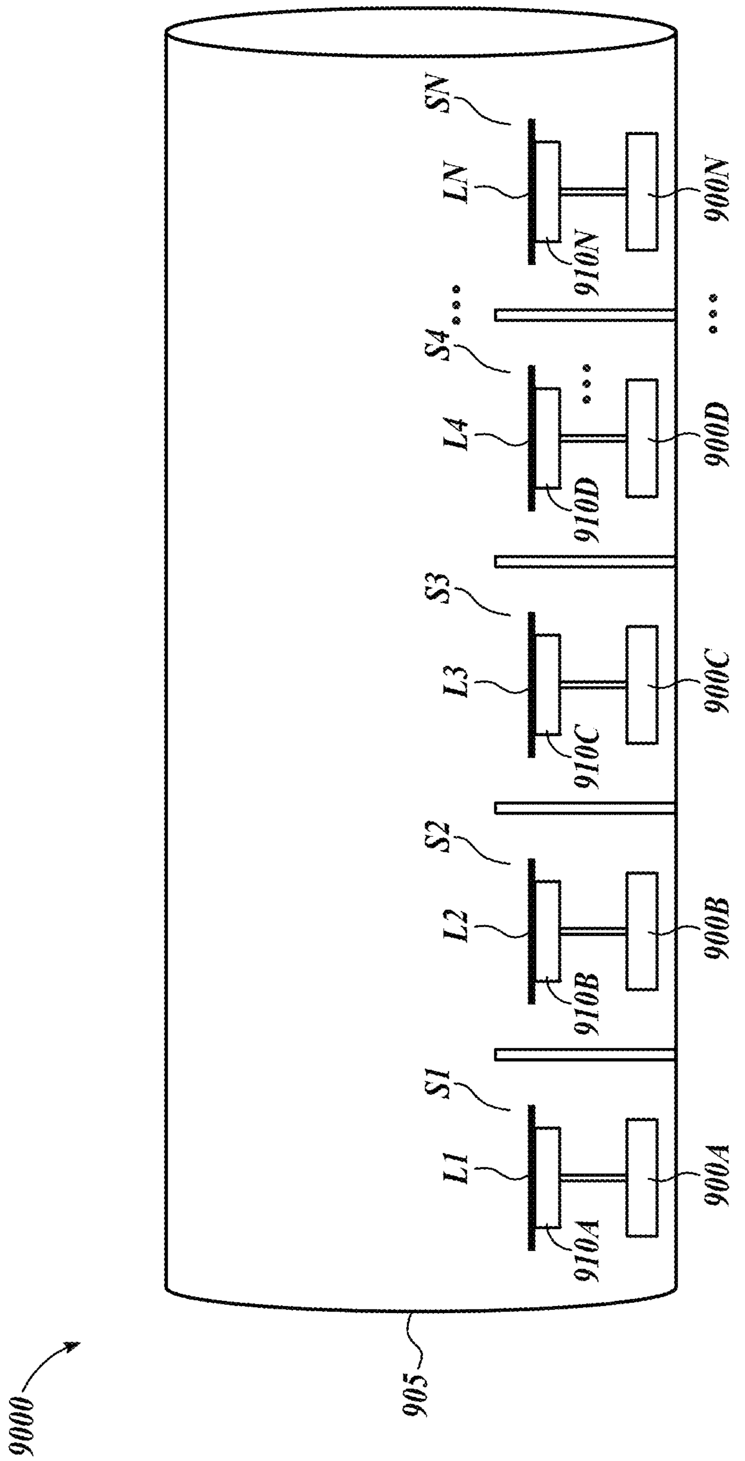
FIGS. 9A-9C are example eyelash dispensers, in accordance with the present technology.
Figure 9B:
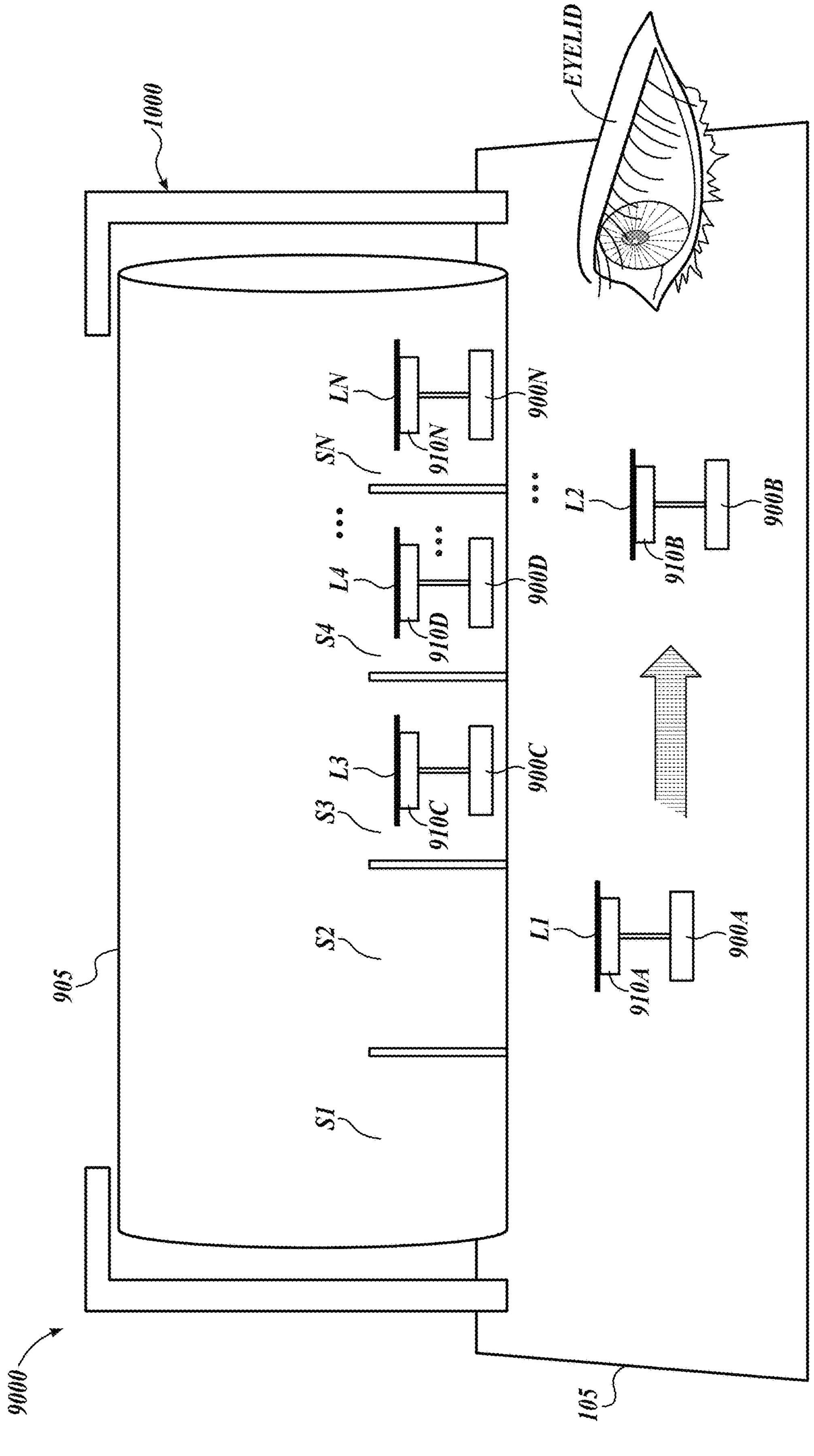
Figure 9C:
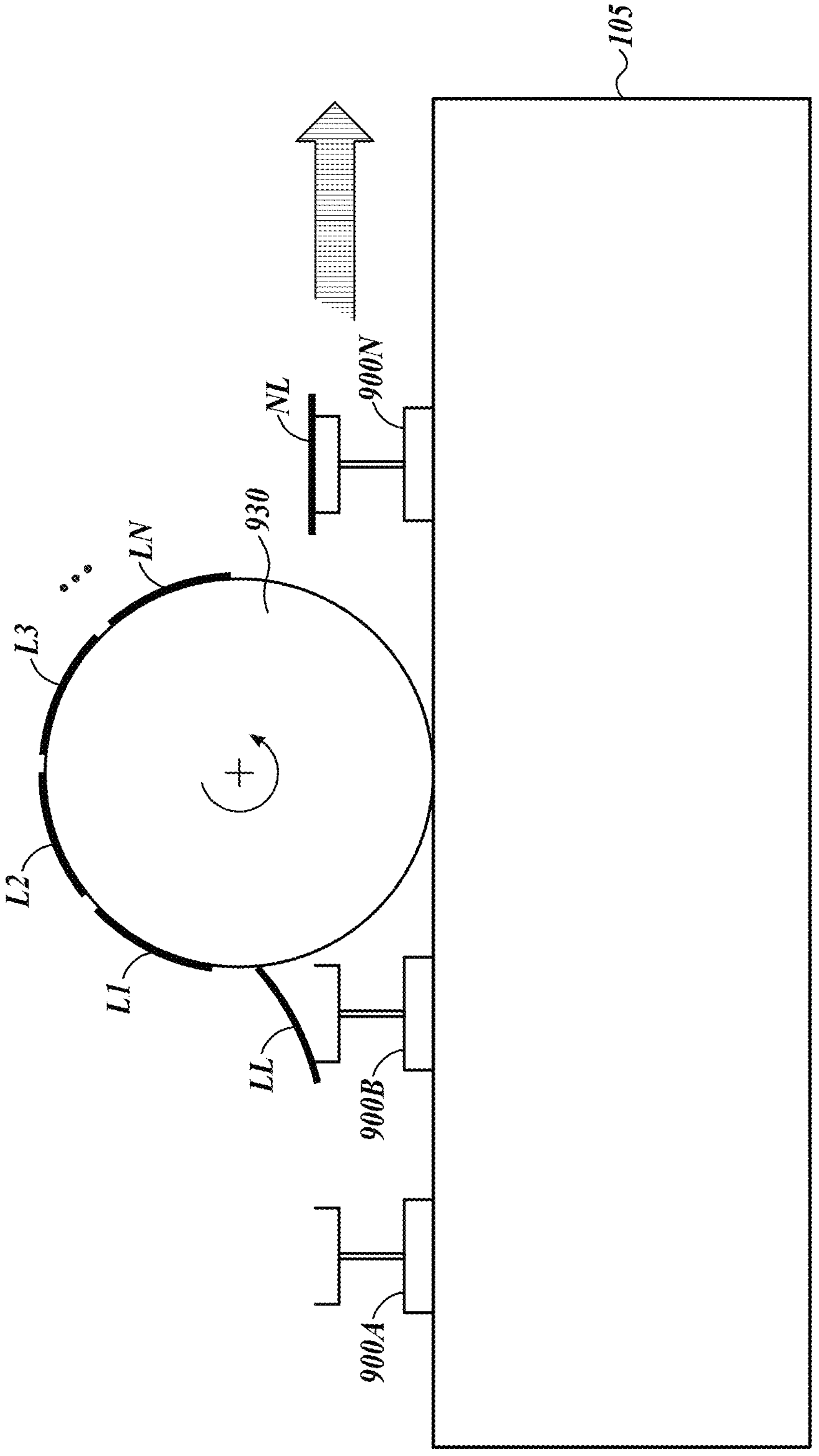

FIGS. 9A-9C are example eyelash dispensers 9000, in accordance with the present technology. In some embodiments, the system 1000 includes an eyelash dispenser 9000. In some embodiments, the eyelash dispenser 9000 includes a body 905 having a plurality of slots. While five slots are shown, it should be understood that any number of slots may be included in the body 905. In some embodiments, the body 905 may not have any slots.

In some embodiments, inside the body 905 is one or more micro-robots 900A, 900B, 900C, 900D . . . 900N. In some embodiments, each slot of the body 905 includes a single micro-robot. In some embodiments, each slot of the body 905 includes multiple micro-robots. In some embodiments, each micro-robot of the one or more micro-robots 900A, 900B, 900C, 900D . . . 900N is configured to carry and apply a single eyelash or eyelash cluster L1, L2, L3, L4 . . . . LN. In some embodiments, each micro-robot of the one or more micro-robots 900A, 900B, 900C, 900D . . . 900N includes an applicator 910A, 910B, 910C, 910D . . . 910N. In some embodiments, the applicators 910A, 910B, 910C, 910D . . . 910N are double pronged applicators configured to hold an eyelash or eyelash cluster L1, L2, L3, L4 . . . . LN. In some embodiments, the applicators 910A, 910B, 910C, 910D . . . 910N may be attachment ends (such as attachment end 220), separating tips (such as separating tip 440) or a combination thereof. Further, while the one or more micro-robots 900A, 900B, 900C, 900D . . . 900N are illustrated as having a particular form factor, it should be understood that the one or more micro-robots 900A, 900B, 900C, 900D . . . 900N may be any of the micro-robots described herein, including (such as micro-robots 200, 200A, 200B, 400A, 400B, 400A-i, 400B-i, 400B-ii, and 400B-ii). In some embodiments, each slot of the dispenser 9000 may include a micro-robot system, such as systems 2000, 4000, or a combination thereof. In some embodiments, the eyelashes or eyelash clusters L1, L2, L3, L4 . . . . LN are precoated, dipped, sprayed, or the like with an adhesive, such as eyelash glue, magnetic liner, or the like. In this manner, the eyelashes or eyelash clusters L1, L2, L3, L4 . . . . LN may be applied by holding the eyelashes or eyelash clusters L1, L2, L3, L4 . . . . LN to a user's lash line with the one or more micro-robots 900A, 900B, 900C, 900D . . . 900N.

As shown in FIG. 9B, in some embodiments, the dispenser 9000 may be inserted into the system 1000, such that the one or more micro-robots 900A, 900B, 900C, 900D . . . 900N are released onto a flexible printed circuit board (PCB) substrate 105 (as shown and described in FIGS. 6A-6E and 7A-7C. The one or more micro-robots 900A, 900B, 900C, 900D . . . 900N may then move in a direction (indicated by the arrow) towards the eyelid of a user (such as user 3000) to apply individual eyelashes or eyelash clusters.

In some embodiments, the dispenser 9000 (or the system 1000) includes a drum pod 930, as shown in FIG. 9C. In some embodiments, the drum pod 930 is preloaded with eyelashes L1, L2, L3 . . . . LN. In some embodiments, the drum pod is located inside the dispenser 9000, but in other embodiments, it may be located on the flexible PCB substrate 105, and the dispensed micro-robots 900A, 900B, 900N may move from the dispenser to the drum pod 930. As the drum pod 930 rotates, a single eyelash (or eyelash cluster) L1, L2, L3 . . . . LN is fed to a micro-robot (here, micro-robot 900B). The one or more micro-robots 900A, 900B, 900N may queue at the drum pod 930 to each receive their respective single eyelash or eyelash cluster L1, L2, L3 . . . . LN. After being fed an eyelash or eyelash cluster, the one or more micro-robots may then be repositioned at a lash line of a user's eye to apply their respective eyelash or eyelash cluster. In this manner, the same micro-robots may continue to receive and apply eyelashes/eyelash clusters to a user's eye. In some embodiments, after each eyelash or eyelash cluster L1, L2, L3 . . . . LN is applied, the one or more micro-robots 900A, 900B, 900N are recalled to the drum pod 930 to receive an additional eyelash or eyelash cluster.

In some embodiments, the single eyelashes, the eyelash clusters, or both are applied to a first eye and a second eye simultaneously. In some embodiments, each micro-robot of the one or more micro-robots 900A, 900B, 900N may be assigned to either the first eye or the second eye. In some embodiments, each micro-robot of the one or more micro-robots 900A, 900B, 900C may apply eyelashes or eyelash clusters to either eye. In some embodiments, single eyelashes, the eyelash clusters, or both are applied to a first eye and a second eye sequentially. In some embodiments, the flexible PCB substrate 105 may be adjusted as described herein as the one or more micro-robots 900A, 900B, 900N slide or levitate across it.

Figure 10:
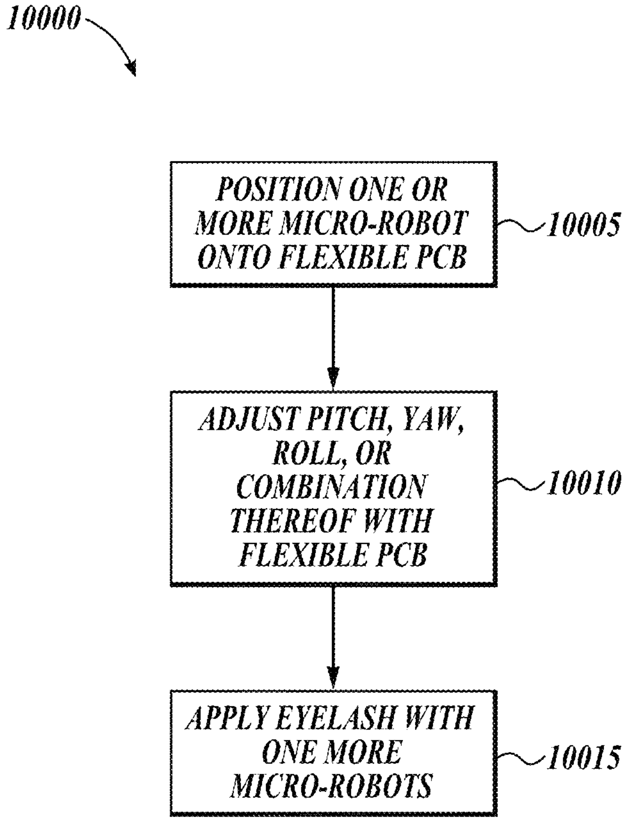
FIG. 10 is a method of using a system for applying eyelashes, in accordance with the present technology.

FIG. 10 is a method 10000 of using a system for applying eyelashes, in accordance with the present technology. In some embodiments, the method 10000 is carried out by the systems (such as systems 1000, 2000, 4000, 9000) shown and described herein. In some embodiments, the method 10000 includes one or more micro-robots (such as micro-robots 200, 200A, 200B, 400A, 400A-i, 400A-ii, 400B, 400B-i, 400B-ii, 900A, 900B, 900C, 900N, or a combination thereof), a flexible PCB substrate (such as flexible PCB substrate 105), one or more linear actuators (such as one or more linear actuators 115A, 115B, 115C . . . 115N), a motor base (such as motor base 120), and one or more eyelashes or eyelash clusters (such as one or more eyelash or eyelash clusters L1, L2, L3, L4 . . . . LN).

In block 10005, one or more micro-robots are positioned onto the flexible PCB substrate. In some embodiments, positioning the one or more micro-robots includes directing the one or more micro-robots to a position below or at a lash line, eyelid, or eye of a user (such as user 3000). In some embodiments, such as when the one or more micro-robots together make up a system for applying eyelashes (such as system 2000 or micro-robot crane system 4000), positioning the one or more micro-robots includes positioning the one or more micro-robots in a predetermined proximity to one another.

In block 10010, a pitch, yaw, roll, or combination thereof is adjusted with the flexible PCB substrate. In some embodiments, this is done by actuating the one or more linear actuators with the motor base to bend, flex, or otherwise adjust the flexible PCB substrate. In some embodiments, such as when the one or more micro-robots includes an applicator (such as such as applicator 210, attachment end 220, separating tip 440, or applicator 910), adjusting the flexible PCB substrate may also adjust an angle of attack of the applicator.

In block 10015, an eyelash (or eyelash cluster) is applied with the one or more micro-robots, as shown and described herein.

Figure 11:
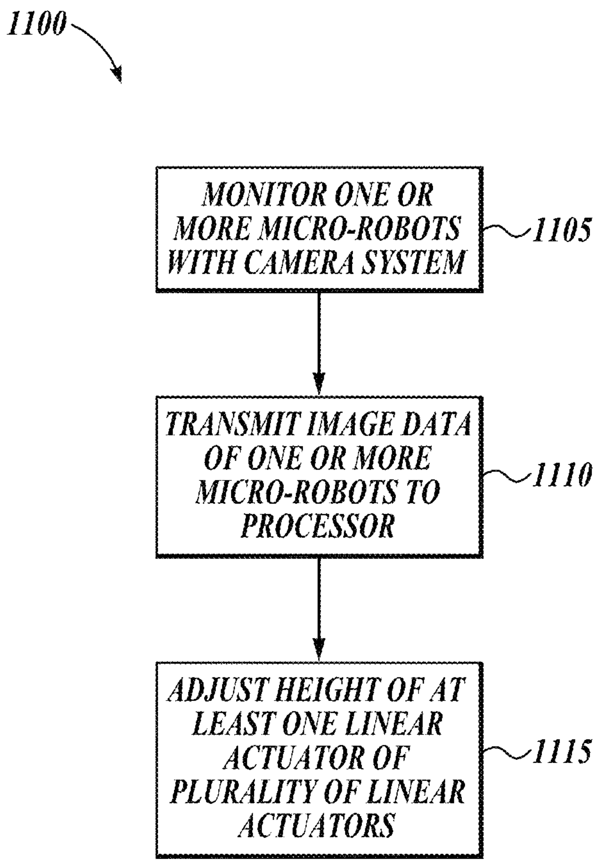
FIG. 11 is another method of using a system for applying eyelashes, in accordance with the present technology.

FIG. 11 is another method 1100 of using a system for applying eyelashes, in accordance with the present technology. In some embodiments, the method 1100 is carried out by the systems (such as systems 1000, 2000, 4000, 9000) shown and described herein. In some embodiments, the method 1100 includes one or more micro-robots (such as microrobots 200, 200A, 200B, 400A, 400A-i, 400A-ii, 400B, 400B-i, 400B-ii, 900A, 900B, 900C, 900N, or a combination thereof), a flexible PCB substrate (such as flexible PCB substrate 105), one or more linear actuators (such as one or more linear actuators 115A, 115B, 115C . . . 115N), a motor base (such as motor base 120), and one or more eyelashes or eyelash clusters (such as one or more eyelash or eyelash clusters L1, L2, L3, L4 . . . . LN). In some embodiments, method 1100 further includes a camera system (such as one or more cameras 1005A, 1005B, 1005C), and a processor (such as processor 1010).

In block 1105, the one or more micro-robots are monitored with the camera system. In some embodiments, the camera system is configured to capture stereo images (or "image data") of the one or more micro-robots, the flexible PCB substrate, and/or the user (such as a user's eye, lash line, or the like).

In block 1110, the camera system transmits the image data to the processor. In some embodiments, the processor analyzes the image data to determine a location of the one or more micro-robots, a location of a user's eye/lash line, a density of a user's eyelashes, and a desired location for the one or more micro-robots. The processor may direct the one or more micro-robots to the desired location, or to a secondary location close to the desired location, where if the flexible PCB substrate was adjusted, would result in the one or more micro-robots being in the desired location. For example, if the one or more micro-robots needed to be at a lash line of a first eye of the user, but the flexible PCB substrate was below the lash line of the user, the process may direct the one or more micro-robots to the secondary location below the lash line, with the intention of then adjusting the flexible PCB substrate to raise the one or more micro-robots to the lash line (i.e., the desired location).

In block 1115, the flexible PCB substrate is adjusted by adjusting the height of at least one linear actuator of the plurality of linear actuators. In some embodiments, a pitch, yaw, roll, or combination thereof of the one or more micro-robots is adjusted with the flexible PCB substrate. In some embodiments, this is done by actuating the one or more linear actuators with the motor base to bend, flex, or otherwise adjust the flexible PCB substrate. In some embodiments, such as when the one or more micro-robots includes an applicator (such as such as applicator 210, attachment end 220, separating tip 440, or applicator 910), adjusting the flexible PCB substrate may also adjust an angle of attack of the applicator. As described herein, in some embodiments, each linear actuator of the plurality of linear actuators is configured to be controlled independently from one another.

Figure 12:
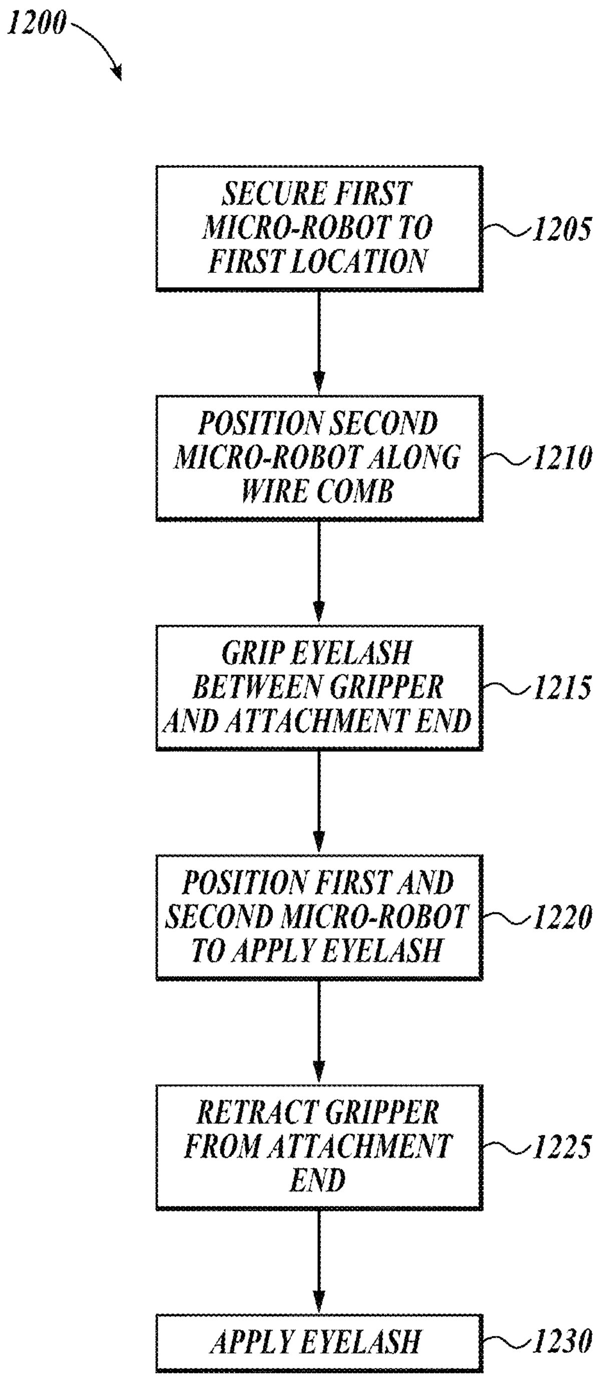
FIG. 12 is yet another method of using a system for applying eyelashes, in accordance with the present technology.

FIG. 12 is yet another method 1200 of using a system for applying eyelashes, in accordance with the present technology. In some embodiments, the method 1200 is carried out by the systems (such as systems 1000, 2000, 4000, 9000) shown and described herein. In some embodiments, the method 1100 includes one or more micro-robots (such as microrobots 200, 200A, 200B, 400A, 400A-i, 400A-ii, 400B, 400B-i, 400B-ii, 900A, 900B, 900C, 900N, or a combination thereof), a flexible PCB substrate (such as flexible PCB substrate 105), one or more linear actuators (such as one or more linear actuators 115A, 115B, 115C . . . 115N), a motor base (such as motor base 120), and one or more eyelashes or eyelash clusters (such as one or more eyelash or eyelash clusters L1, L2, L3, L4 . . . . LN). In some embodiments, method 1200 further includes a system for applying eyelashes (such as system 2000). In some embodiments, the system for applying eyelashes includes a first micro-robot (such as first micro-robot 200A in FIGS. 2A-2B), having a first plurality of magnets (such as first plurality of magnets 205A-i, 205B-i, 205C-i . . . 205N-i) and a wire comb (such as wire comb 215) with an attachment end (such as attachment end 220), and a second micro-robot (such as second micro-robot 200B in FIGS. 2A-2B) having a second plurality of magnets (such as second plurality of magnets 205A-ii, 205B-ii, 205C-ii . . . 205N-ii), a tube (such as tube 210B), and a gripper (such as gripper 225).

In block 1205, the first micro-robot is secured to a first location. In some embodiments, the first micro-robot retains the wire comb in a holder (such as holder 210A). In some embodiments, the first micro-robot remains stationary throughout method 1200.

In block 1210, the second micro-robot is positioned along the wire comb. In some embodiments, the second micro-robot includes the tube, which the wire comb is threaded through. In this manner, the second micro-robot can slide back and forth along the wire comb.

In block 1215, an eyelash (or eyelash cluster) is gripped between the gripper of the second micro-robot and the attachment end of the wire comb. The second micro-robot may slide along the wire comb to the attachment end until the gripper contacts the attachment end of the wire comb, securing the eyelash between the gripper and the attachment end. In some embodiments, the second micro-robot includes a first gripper (such as first gripper 225A) and a second gripper (such as second gripper 225B). The first gripper and the second gripper may be offset by a distance (such as offset distance O). In such embodiments, the attachment end may slot into the offset distance, retaining the eyelash between the first gripper, the second gripper, and the attachment end.

In block 1220, the first micro-robot and the second micro-robot are positioned to apply the eyelash. In some embodiments, both the first micro-robot and the second micro-robot move in a same direction at a same speed to maintain a same distance between them as the first micro-robot and the second micro-robot move towards the eye. This allows for the eyelash to remain retained until the first micro-robot and the second micro-robot are in position to apply the eyelash.

In block 1225, the gripper is retracted from the attachment end, releasing the eyelash. In some embodiments, the gripper and the attachment end remain stationary for a period of time before the gripper is retracted, to give time for adhesive to stick, cure, or otherwise apply the eyelash. In some embodiments, retracting the gripper includes moving the second micro-robot in the direction opposite of the attachment end.

In block 1230, the eyelash is applied.

Figure 13:
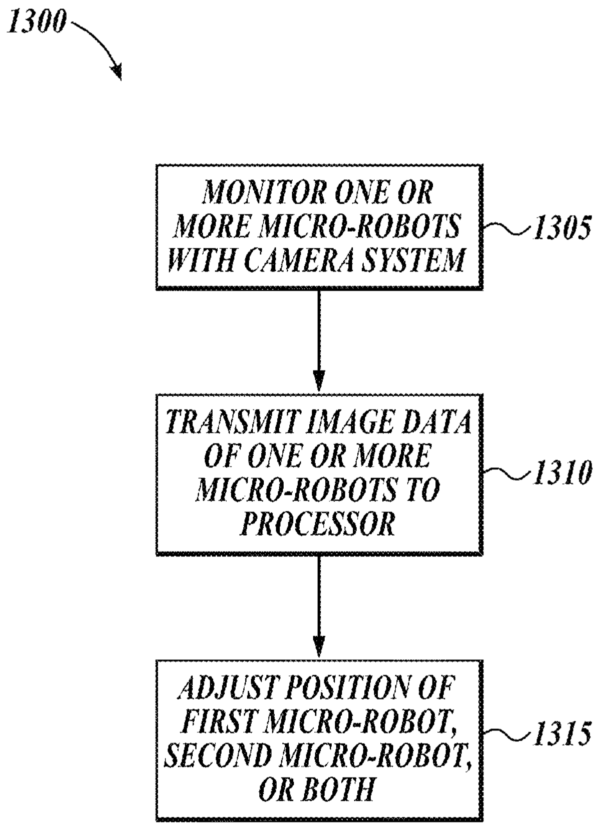
FIG. 13 is another method of using a system for applying eyelashes, in accordance with the present technology.

FIG. 13 is another method 1300 of using a system for applying eyelashes, in accordance with the present technology. In some embodiments, the method 1300 is carried out by the systems (such as systems 1000, 2000, 4000, 9000) shown and described herein. In some embodiments, the method 1100 includes one or more micro-robots (such as microrobots 200, 200A, 200B, 400A, 400A-i, 400A-ii, 400B, 400B-i, 400B-ii, 900A, 900B, 900C, 900N, or a combination thereof), a flexible PCB substrate (such as flexible PCB substrate 105), one or more linear actuators (such as one or more linear actuators 115A, 115B, 115C . . . 115N), a motor base (such as motor base 120), and one or more eyelashes or eyelash clusters (such as one or more eyelash or eyelash clusters L1, L2, L3, L4 . . . . LN). In some embodiments, method 1300 further includes a camera system (such as one or more cameras 1005A, 1005B, 1005C), and a processor (such as processor 1010). In some embodiments, method 1300 further includes a system for applying eyelashes (such as system 2000). In some embodiments, the system for applying eyelashes includes a first micro-robot (such as first micro-robot 200A in FIGS. 2A-2B), having a first plurality of magnets (such as first plurality of magnets 205A-i, 205B-i, 205C-i . . . 205N-i) and a wire comb (such as wire comb 215) with an attachment end (such as attachment end 220), and a second micro-robot (such as second micro-robot 200B in FIGS. 2A-2B) having a second plurality of magnets (such as second plurality of magnets 205A-ii, 205B-ii, 205C-ii . . . 205N-ii), a tube (such as tube 210B), and a gripper (such as gripper 225).

In block 1305, the one or more micro-robots are monitored with the camera system. In some embodiments, the camera system is configured to capture stereo images (or "image data") of the one or more micro-robots, the flexible PCB substrate, and/or the user (such as a user's eye, lash line, or the like).

In block 1310, the camera system transmits the image data to the processor. In some embodiments, the processor analyzes the image data to determine a location of the one or more micro-robots, a location of a user's eye/lash line, a density of a user's eyelashes, and a desired location for the one or more micro-robots.

In block 1315, the position of the first micro-robot and/or the second micro-robot is adjusted. The processor may direct the one or more micro-robots to the desired location, or to a secondary location close to the desired location, where if the flexible PCB substrate was adjusted, would result in the one or more micro-robots being in the desired location. For example, if the one or more micro-robots needed to be at a lash line of a first eye of the user, but the flexible PCB substrate was below the lash line of the user, the process may direct the one or more micro-robots to the secondary location below the lash line, with the intention of then adjusting the flexible PCB substrate to raise the one or more micro-robots to the lash line (i.e., the desired location). In some embodiments, adjusting the position of the first micro-robot and/or the second micro-robot includes adjusting the flexible PCB substrate by adjusting the height of at least one linear actuator of the plurality of linear actuators. In some embodiments, a pitch, yaw, roll, or combination thereof of the one or more micro-robots is adjusted with the flexible PCB substrate. In some embodiments, this is done by actuating the one or more linear actuators with the motor base to bend, flex, or otherwise adjust the flexible PCB substrate. In some embodiments, such as when the one or more micro-robots includes an applicator (such as such as applicator 210, attachment end 220, separating tip 440, or applicator 910), adjusting the flexible PCB substrate may also adjust an angle of attack of the applicator. As described herein, in some embodiments, each linear actuator of the plurality of linear actuators is configured to be controlled independently from one another.

Figure 14:
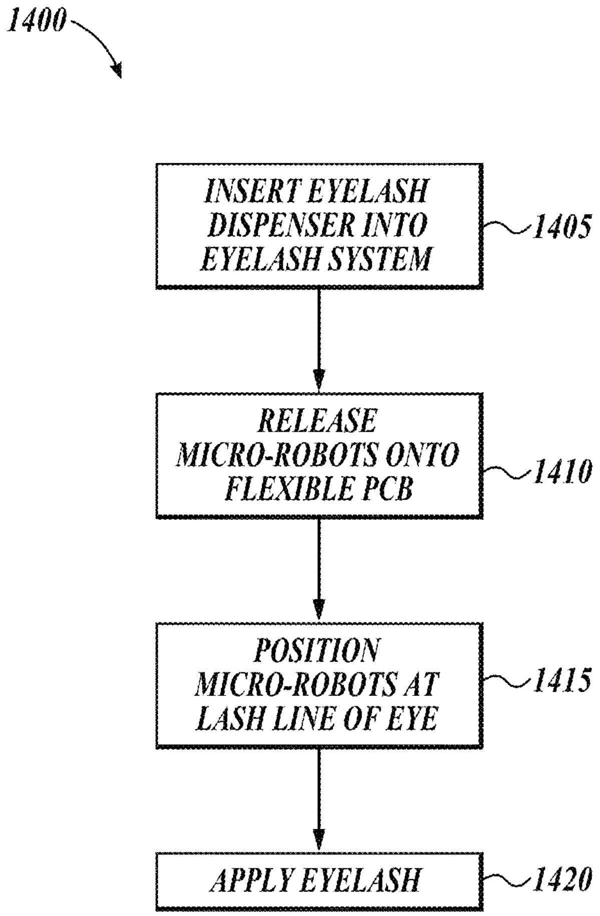
FIG. 14 is a method of using an eyelash dispenser, in accordance with the present technology.

FIG. 14 is a method 1400 of using an eyelash dispenser, in accordance with the present technology. In some embodiments, the method 1400 is carried out by the systems (such as systems 1000, 2000, 4000, 9000) shown and described herein. In some embodiments, the method 1400 includes one or more micro-robots (such as microrobots 200, 200A, 200B, 400A, 400A-i, 400A-ii, 400B, 400B-i, 400B-ii, 900A, 900B, 900C, 900N, or a combination thereof), a flexible PCB substrate (such as flexible PCB substrate 105), one or more linear actuators (such as one or more linear actuators 115A, 115B, 115C . . . 115N), a motor base (such as motor base 120), and one or more eyelashes or eyelash clusters (such as one or more eyelash or eyelash clusters L1, L2, L3, L4 . . . . LN). In some embodiments, method 1400 further includes a camera system (such as one or more cameras 1005A, 1005B, 1005C), and a processor (such as processor 1010). The method 1400 may also include an eyelash dispenser (such as eyelash dispenser 9000) having a body (such as body 905) and a plurality of slots (such as plurality of slots S1, S2, S3, S4 . . . . SN). The eyelash dispenser may retain the one or more micro-robots. In some embodiments, either the eyelash dispenser or the flexible PCB substrate may further include a drum pod (such as drum pod 930) pre-loaded with a plurality of eyelashes or eyelash clusters (such as plurality of eyelashes L1, L2, L3 . . . . LN).

In block 1405, the eyelash dispenser is inserted into an eyelash system (such as system for applying eyelashes 1000). In some embodiments, the eyelash dispenser has a body that can be placed into or otherwise retained by the eyelash system.

In block 1410, one or more micro-robots are released onto the flexible PCB substrate. In some embodiments, the one or more micro-robots are directed to the PCB substrate, such as with the processor in tandem with the camera system. In some embodiments, the one or more micro-robots are located in slots of the body of the dispenser, and may then slide or levitate onto the flexible PCB substrate.

In block 1415, the one or more micro-robots are positioned at a lash line of an eye. In some embodiments, the processor may direct the one or more micro-robots to the desired location, or to a secondary location close to the desired location, where if the flexible PCB substrate was adjusted, would result in the one or more micro-robots being in the desired location. For example, if the one or more micro-robots needed to be at a lash line of a first eye of the user, but the flexible PCB substrate was below the lash line of the user, the process may direct the one or more micro-robots to the secondary location below the lash line, with the intention of then adjusting the flexible PCB substrate to raise the one or more micro-robots to the lash line (i.e., the desired location). In some embodiments, adjusting the position of the first micro-robot and/or the second micro-robot includes adjusting the flexible PCB substrate by adjusting the height of at least one linear actuator of the plurality of linear actuators. In some embodiments, a pitch, yaw, roll, or combination thereof of the one or more micro-robots is adjusted with the flexible PCB substrate. In some embodiments, this is done by actuating the one or more linear actuators with the motor base to bend, flex, or otherwise adjust the flexible PCB substrate. In some embodiments, such as when the one or more micro-robots includes an applicator (such as such as applicator 210, attachment end 220, separating tip 440, or applicator 910), adjusting the flexible PCB substrate may also adjust an angle of attack of the applicator. In some embodiments, adjusting the position of the one or more micro-robots includes sliding or levitating the one or more micro-robots over the flexible PCB substrate.

In block 1420, the eyelash is applied.

Figure 15:
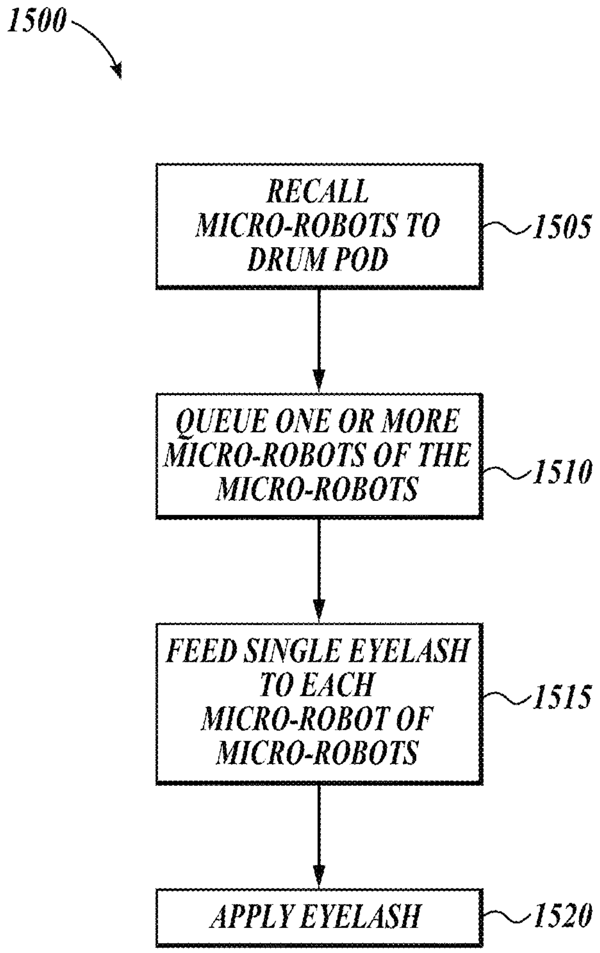
FIG. 15 is another method of using an eyelash dispenser, in accordance with the present technology.

FIG. 15 is another method 1500 of using an eyelash dispenser, in accordance with the present technology. In some embodiments, the method 1500 is carried out by the systems (such as systems 1000, 2000, 4000, 9000) shown and described herein. In some embodiments, the method 1500 includes one or more micro-robots (such as microrobots 200, 200A, 200B, 400A, 400A-i, 400A-ii, 400B, 400B-i, 400B-ii, 900A, 900B, 900C, 900N, or a combination thereof), a flexible PCB substrate (such as flexible PCB substrate 105), one or more linear actuators (such as one or more linear actuators 115A, 115B, 115C . . . 115N), a motor base (such as motor base 120), and one or more eyelashes or eyelash clusters (such as one or more eyelash or eyelash clusters L1, L2, L3, L4 . . . . LN). In some embodiments, method 1400 further includes a camera system (such as one or more cameras 1005A, 1005B, 1005C), and a processor (such as processor 1010). The method 1500 may also include an eyelash dispenser (such as eyelash dispenser 9000) having a body (such as body 905) and a plurality of slots (such as plurality of slots S1, S2, S3, S4 . . . . SN). The eyelash dispenser may retain the one or more micro-robots. In some embodiments, either the eyelash dispenser or the flexible PCB substrate may further include a drum pod (such as drum pod 930) pre-loaded with a plurality of eyelashes or eyelash clusters (such as plurality of eyelashes L1, L2, L3 . . . . LN). In some embodiments, the method 1500 occurs after the method 1400.

In block 1505, the one or more micro-robots are recalled to the drum pod.

In block 1510, the one or more micro-robots queue for the drum pod, to receive an eyelash or eyelash cluster from the drum pod.

In block 1515, a single eyelash or eyelash cluster is fed to each micro-robot of the one or more micro-robots that have queued. In some embodiments, a single eyelash or eyelash cluster is fed to a group of robots (such as system 2000).

In block 1520, the eyelash or eyelash cluster is applied.

It should be understood that all methods 10000, 1100, 1200, 1300, 1400, and 1500 should be interpreted as merely representative. In some embodiments, process blocks of all methods 10000, 1100, 1200, 1300, 1400, and 1500 may be performed simultaneously, sequentially, in a different order, or even omitted, without departing from the scope of this disclosure.

While illustrative embodiments have been illustrated and described, it will be appreciated that various changes can be made therein without departing from the spirit and scope of the invention.

The present application may reference quantities and numbers. Unless specifically stated, such quantities and numbers are not to be considered restrictive, but representative of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

Embodiments disclosed herein may utilize circuitry in order to implement technologies and methodologies described herein, operatively connect two or more components, generate information, determine operation conditions, control an appliance, device, or method, and/or the like. Circuitry of any type can be used. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

An embodiment includes one or more data stores that, for example, store instructions or data. Non-limiting examples of one or more data stores include volatile memory (e.g., Random Access memory (RAM), Dynamic Random Access memory (DRAM), or the like), non-volatile memory (e.g., Read-Only memory (ROM), Electrically Erasable Programmable Read-Only memory (EEPROM), Compact Disc Read-Only memory (CD-ROM), or the like), persistent memory, or the like. Further non-limiting examples of one or more data stores include Erasable Programmable Read-Only memory (EPROM), flash memory, or the like. The one or more data stores can be connected to, for example, one or more computing devices by one or more instructions, data, or power buses.

In an embodiment, circuitry includes a computer-readable media drive or memory slot configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "vertical," "horizontal," "front," "rear," "left,"

"right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

We claim:

1. A micro-robot crane system comprising:
- a microrobot crane, comprising:
  - a back micro-robot, comprising:
    - a first plurality of magnets,
    - a rotary bearing, and
    - a separation arm, wherein the separation arm includes a separating tip; and
  - a front micro-robot, comprising:
    - a second plurality of magnets;
    - a mount configured to slide along the separation arm, and
    - a mechanical stop, configured to prevent the separation arm from disengaging from the mount, and wherein the front micro-robot is configured to raise and lower the separation arm;
- wherein the front micro-robot and the back micro-robot are configured to move in a same direction together to separate an adjacent lash.

2. The system of claim 1, wherein the back micro-robot is configured to remain stationary, while the front micro-robot moves the separating arm up or down.

3. The system of claim 1, wherein the separating tip is configured to separate adjacent eyelashes.

4. The system of claim 1, wherein the micro-robot crane is a first micro-robot crane and the system further comprises a second micro-robot crane.

5. The system of claim 4, wherein the second microrobot crane comprises a second separation arm.

6. The system of claim 4, wherein the second microrobot crane comprises a second back micro-robot, and a second front micro-robot.

7. The system of claim 6, wherein the first front micro-robot and the first back micro-robot are configured to separate a first adjacent lash on a first side, and wherein the second front micro-robot and the second back micro-robot are configured to separate a second adjacent lash on a second side, opposite the first side.

8. The system of claim 1, wherein the system further comprises:
- a flexible printed circuit board (PCB) substrate;
- a motor base located under the flexible PCB substrate; and
- one or more linear actuators coupled to the motor base, wherein the one or more linear actuators are configured to adjust the flexible PCB.

9. The system of claim 8, wherein the system further comprises one or more cameras configured to analyze a user, the micro-robot crane, the flexible PCB, or a combination thereof.

10. The system of claim 9, wherein the one or more cameras is communicatively coupled with a processor, wherein the processor is configured to determine a desired height of the one or more linear actuators, a repositioning of the micro-robot crane, or both.

11. The system of claim 1, wherein the flexible PCB is configured to adjust a pitch, a yaw, a roll, or a combination thereof of the front micro-robot, the back micro-robot, or both.

12. A method of separating an eyelash, the method comprising:
- moving a first micro-robot crane to a first side of an eye;
- moving a second micro-robot crane to a second side of an eye;
- positioning a second separator tip of a second separator arm into the lash line of the eye by moving a front micro-robot of the second micro-robot crane;
- moving the first micro-robot crane in a second direction to separate a second side of the eyelashes, so that a gap is formed between the first side of the eyelashes and the second side of the eyelashes;
- wherein positioning the first micro-robot crane, the second micro-robot crane, or both comprises sliding or levitating the one or more micro-robots over a flexible printed circuit board (PCB) substrate.

13. The method of claim 12, wherein the method further comprises: applying a single eyelash into the gap between the first side of the eyelashes and the second side of the eyelashes.

14. The method of claim 13, wherein applying the single eyelash comprises:
- securing a first micro-robot having a wire comb to a first location;
- positioning a second micro-robot along the wire comb with a tube so that a gripper of the second micro-robot contacts an attachment end of the wire comb;
- gripping an eyelash between the gripper and the attachment end;
- positioning the second micro-robot to apply the eyelash;
- retracting the gripper from the attachment end; and
- applying the eyelash.

15. The method of claim 14, wherein the second micro-robot further comprises a first gripper and a second gripper, and wherein the method further comprises:
- gripping an eyelash between the attachment end and an offset distance between the first gripper and the second gripper.

16. The method of claim 12, wherein the method further comprises:
- monitoring the first micro-robot crane, the second micro-robot crane, or both; and
- transmitting image data to the processor; and adjusting a position of the first micro-robot crane, the second micro-robot crane, or both based on the image data.

* * * * *